US011630339B2

(12) United States Patent
Kouyama

(10) Patent No.: US 11,630,339 B2
(45) Date of Patent: Apr. 18, 2023

(54) DISPLAY ELEMENT AND PROJECTION TYPE DISPLAY APPARATUS

(71) Applicant: SONY SEMICONDUCTOR SOLUTIONS CORPORATION, Kanagawa (JP)

(72) Inventor: Yoshiaki Kouyama, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 17/309,941

(22) PCT Filed: Dec. 24, 2019

(86) PCT No.: PCT/JP2019/050514
§ 371 (c)(1),
(2) Date: Jul. 1, 2021

(87) PCT Pub. No.: WO2020/149115
PCT Pub. Date: Jul. 23, 2020

(65) Prior Publication Data
US 2022/0066261 A1 Mar. 3, 2022

(30) Foreign Application Priority Data
Jan. 16, 2019 (JP) .............................. JP2019-005410

(51) Int. Cl.
*G02F 1/1335* (2006.01)
*G02B 3/00* (2006.01)
*G03B 21/20* (2006.01)

(52) U.S. Cl.
CPC ..... *G02F 1/133526* (2013.01); *G02B 3/0006* (2013.01); *G02F 1/133512* (2013.01); *G03B 21/2033* (2013.01)

(58) Field of Classification Search
CPC ......... G02F 1/133526; G02F 1/133504; G02F 2201/30; G02F 2201/305; G02B 3/0006;
(Continued)

(56) References Cited

U.S. PATENT DOCUMENTS

| 5,340,978 A | 8/1994 | Rostoker et al. |
| 5,432,333 A | 7/1995 | Rostoker et al. |

(Continued)

FOREIGN PATENT DOCUMENTS

| EP | 0893915 A | 1/1999 |
| GB | 401190 | 1/2004 |

(Continued)

OTHER PUBLICATIONS

International Search Report and Written Opinion of PCT Application No. PCT/JP2019/050514, dated Mar. 24, 20120, 10 pages of ISRWO.

*Primary Examiner* — Angela K Davison
(74) *Attorney, Agent, or Firm* — Chip Law Group

(57) ABSTRACT

A display element according to an embodiment of the present technology includes an optical control layer and a lens layer. The optical control layer modulates incident light for each pixel. The lens layer includes an incident surface, a plurality of refractive lenses disposed for each pixel, and a plurality of diffractive lenses disposed for each pixel to face the plurality of refractive lenses, and emits light incident from the incident surface and passing through the plurality of refractive lenses and the plurality of diffractive lenses to the optical control layer.

17 Claims, 15 Drawing Sheets

(58) Field of Classification Search
CPC .. G02B 5/1814; G02B 5/1842; G02B 5/1876; G02B 5/1885
See application file for complete search history.

(56) References Cited

U.S. PATENT DOCUMENTS

| | | |
|---|---|---|
| 5,519,205 A | 5/1996 | Rostoker |
| 5,648,655 A | 7/1997 | Rostoker |
| 5,760,834 A | 6/1998 | Rostoker |
| 5,796,522 A | 8/1998 | Meyers |
| 5,977,535 A | 11/1999 | Rostoker |
| 2015/0041833 A1* | 2/2015 | Nimura ............. H01L 29/78633 257/88 |
| 2015/0293277 A1* | 10/2015 | Ando ................... G02B 5/1847 359/570 |
| 2019/0155096 A1* | 5/2019 | Gao ..................... G02B 5/1876 |
| 2021/0341790 A1* | 11/2021 | Meng ............... G02F 1/133605 |

FOREIGN PATENT DOCUMENTS

| | | |
|---|---|---|
| GB | 2410339 A | 7/2005 |
| JP | 11-127390 A | 5/1999 |
| JP | 2000-305472 A | 11/2000 |
| JP | 2001-059963 A | 3/2001 |
| JP | 2002-122709 A | 4/2002 |
| JP | 2005-208644 A | 8/2005 |
| JP | 2018-072757 A | 5/2018 |
| KR | 10-2004-0066566 A | 7/2004 |
| KR | 10-0624409 B1 | 9/2006 |

\* cited by examiner

401

400

400

410

410

412 411

DISPLAY ELEMENT AND PROJECTION TYPE DISPLAY APPARATUS

CROSS REFERENCE TO RELATED APPLICATIONS

This application is a U.S. National Phase of International Patent Application No. PCT/JP2019/050514 filed on Dec. 24, 2019, which claims priority benefit of Japanese Patent Application No. JP 2019-005410 filed in the Japan Patent Office on Jan. 16, 2019. Each of the above-referenced applications is hereby incorporated herein by reference in its entirety.

TECHNICAL FIELD

The present technology relates to a display element and a projection type display apparatus that display an image by modulating incident light.

BACKGROUND ART

In the past, display elements that display images by modulating light using liquid crystal or the like have been widely used. Such display elements are mounted on projectors, displays, or the like. For example, the display element using liquid crystal includes a switching element, wiring, or the like for controlling the liquid crystal, and the intensity of light passing through the liquid crystal is modulated for each pixel.

Further, the display element includes a light shielding portion that shields the switching element, the wiring, or the like from light. Part of the light incident on the display element may be blocked by the light shielding portion. For this reason, a method of suppressing a decrease in the light utilization efficiency by using a microlens or the like has been devised.

For example, Patent Literature 1 describes a liquid crystal device including a microlens array substrate. The microlens array substrate includes first and second microlenses that refract incident light in two stages. Light passing through each microlens passes through a liquid crystal layer and is focused at the center of a pixel while avoiding a light shielding layer. Further, the curvature of a peripheral portion of the second microlens is set to be larger than that of the central portion. This reduces the distance between the microlenses and makes it possible to use oblique light that has not been used until then (e.g., paragraphs [0045], [0069], [0074], and [0092] of the specification, FIGS. 3, 5A, 5B and 5C, and the like of Patent Literature 1).

CITATION LIST

Patent Literature

Patent Literature 1: Japanese Patent Application Laid-open No. 2018-72757

DISCLOSURE OF INVENTION

Technical Problem

As described above, the technique of increasing the luminance of the image by efficiently utilizing the light incident on the display element has been developed. In recent years, an improvement in image quality is expected in addition to high luminance of projectors, displays, etc., and a technique capable of achieving bright and high-quality image display is required.

In view of the above circumstances, it is an object of the present technology to provide a display element and a projection type display apparatus that are capable of achieving bright and high-quality image display.

Solution to Problem

In order to achieve the above object, a display element according to an embodiment of the present technology includes an optical control layer and a lens layer.

The optical control layer modulates incident light for each pixel.

The lens layer includes an incident surface, a plurality of refractive lenses disposed for each pixel, and a plurality of diffractive lenses disposed for each pixel to face the plurality of refractive lenses, and emits light incident from the incident surface and passing through the plurality of refractive lenses and the plurality of diffractive lenses to the optical control layer.

In this display element, light incident on the optical control layer is modulated for each pixel. Light incident on the incident surface of the lens layer and passing through the refractive lens and the diffractive lens disposed for each pixel is emitted to the optical control layer. The refraction and diffraction of light are combined in such a manner, and thus aberration or the like depending on the wavelength of the light is suppressed. As a result, it becomes possible to control the optical path of the light incident on the optical control layer regardless of the wavelength and to achieve bright and high-quality image display.

The lens layer may include a refractive lens array in which the plurality of refractive lenses is two-dimensionally arranged, and a diffractive lens array in which the plurality of diffractive lenses is two-dimensionally arranged.

The lens layer may include an emission surface opposite to the incident surface. In this case, any one of the refractive lens array and the diffractive lens array may be disposed on the incident surface side, and another one may be disposed on the emission surface side.

The optical control layer may include a liquid crystal layer that modulates incident light, and a control substrate that is bonded to the liquid crystal layer and controls the modulation of light by the liquid crystal layer for each pixel. In this case, the lens layer may be disposed facing one of the liquid crystal layer and the control substrate.

The control substrate may include a light shielding portion including a plurality of openings each serving as the pixel. In this case, the refractive lens and the diffractive lens may condense light incident on the incident surface and pass the light through the opening.

The refractive lens and the diffractive lens may collimate an optical path of the light incident on the incident surface and emit the light to the opening.

The lens layer may include a first diffractive lens disposed to correspond to a first opening, and a second diffractive lens disposed to correspond to a second opening adjacent to the first opening, and may emit light incident on a boundary portion between the first diffractive lens and the second diffractive lens toward at least one of the first opening or the second opening.

The control substrate may include a control element that controls the liquid crystal layer for each pixel. In this case, the light shielding portion may shield the control element from light.

The diffractive lens may include a high refractive index layer, and a low refractive index layer having a lower refractive index than a refractive index of the high refractive index layer.

The diffractive lens may have a diffraction pattern in which the high refractive index layer and the low refractive index layer are alternately disposed in a plane direction parallel to the incident surface.

The diffraction pattern may include a central region as the center of the pattern, and a plurality of strip-shaped regions concentrically disposed around the central region, when viewed from the incident surface.

The central region may be eccentrically disposed with respect to the center of the opening when viewed from the incident surface.

The central region may be any one of a circle, an ellipse, a polygon, and a rounded-corner polygon.

The diffractive lens may be formed by embedding the low refractive index layer in the high refractive index layer or formed by embedding the high refractive index layer in the low refractive index layer.

The diffractive lens may be formed at a junction of the high refractive index layer and the low refractive index layer.

The diffractive lens may include a thickness change region in which a ratio of a thickness of the high refractive index layer and a thickness of the low refractive index layer varies stepwise along a plane direction parallel to the incident surface.

The display element may further include a microlens array that is disposed on an opposite side of the lens layer with the optical control layer interposed between the microlens array and the lens layer and controls an optical path of light emitted from the optical control layer.

The microlens array may collimate the optical path of the light emitted from the optical control layer.

A projection type display apparatus according to an embodiment of the present technology includes a light source, a display element, and a projection optical system.

The display element includes an optical control layer that modulates incident light for each pixel, and a lens layer that includes an incident surface on which light emitted from the light source is incident, a plurality of refractive lenses disposed for each pixel, and a plurality of diffractive lenses disposed for each pixel to face the plurality of refractive lenses, and emits light incident from the incident surface and passing through the plurality of refractive lenses and the plurality of diffractive lenses to the optical control layer.

The projection optical system projects an image on the basis of the light modulated for each pixel.

BRIEF DESCRIPTION OF DRAWINGS

FIGS. 16A, 16B, and 15C are schematic diagrams showing an example of an optical path of light incident on a liquid crystal light valve according to a third embodiment.

MODE(S) FOR CARRYING OUT THE INVENTION

Embodiments according to the present technology will now be described below with reference to the drawings.

First Embodiment

[Image Display Apparatus]

Figure 1:
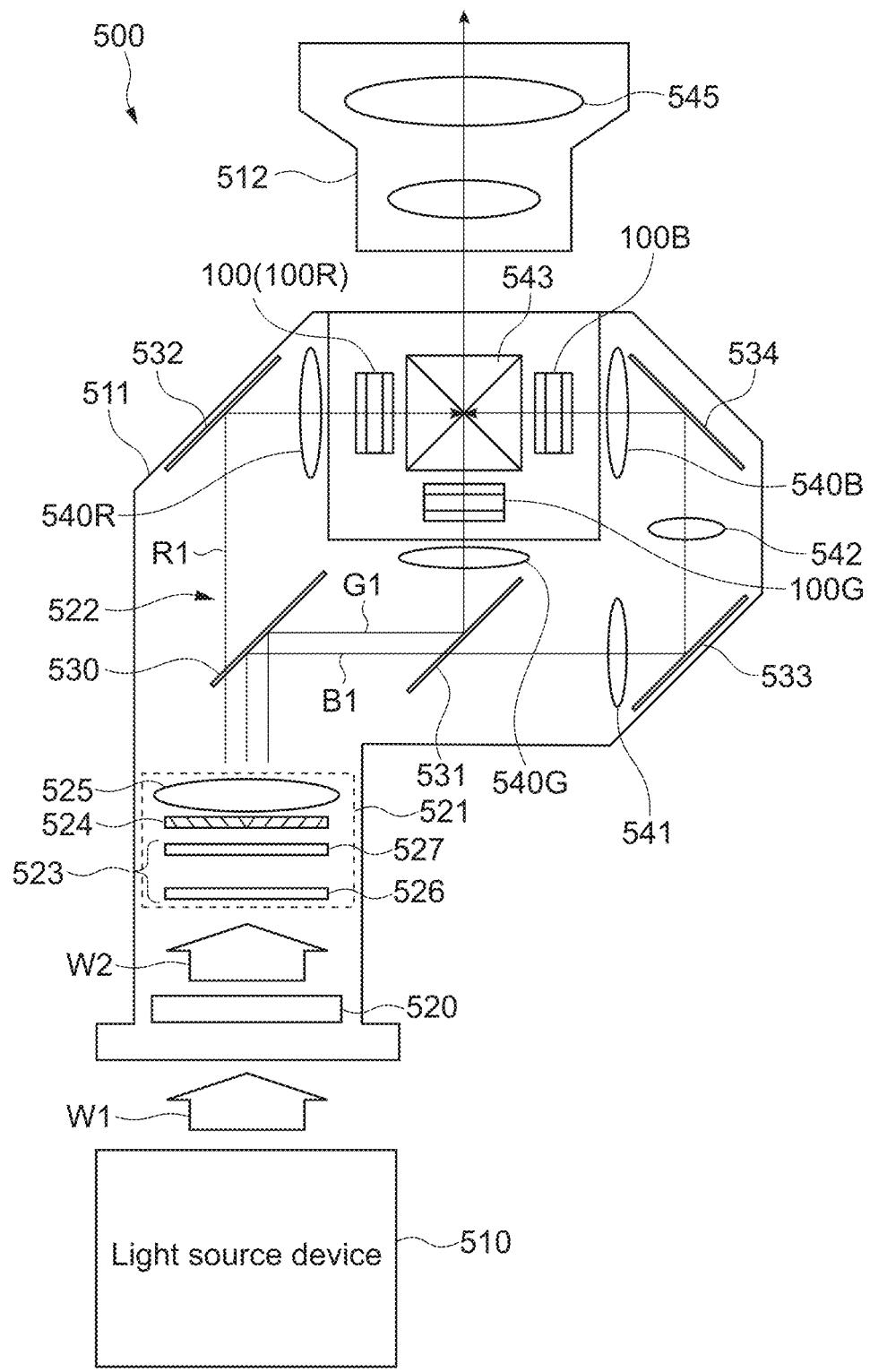
FIG. 1 is a schematic diagram showing a configuration example of an image display apparatus according to a first embodiment of the present technology.

FIG. 1 is a schematic diagram showing a configuration example of an image display apparatus according to a first embodiment of the present technology. An image display apparatus 500 may be used, for example, as a projector for a presentation or a digital cinema. The present technology to be described below is also applicable to an image display apparatus used for other applications. In this embodiment, the image display apparatus 500 corresponds to a projection type display apparatus.

The image display apparatus 500 includes a light source device 510, an image generation system 511, and a projection system 512.

The light source device 510 emits white light W1 to the image generation system 511. As the light source device 510, for example, a solid-state light source such as a laser diode or a light emitting diode is used. Further, the light source device may be configured by using a mercury lamp or the like. In this embodiment, the light source device 510 corresponds to a light source.

The image generation system 511 generates an image on the basis of the white light W1 emitted from the light source device 510. The image generation system 511 includes an optical filter 520, an integrator optical system 521, an illumination optical system 522, and a liquid crystal light valve 100.

The optical filter 520 is a dielectric multilayer film filter including a dielectric multilayer film and functions as a wavelength selecting filter. The optical filter 520 filters the white light W1 emitted from the light source device 510 and adjusts the spectrum (wavelength characteristics) of the white light W1. The filtered white light W2 is emitted to the integrator optical system 521. Note that the specific material of the dielectric multilayer film is not limited, and an appropriate material such as titanium oxide or silicon oxide may be selected so as to exhibit desired filtering characteristics.

The integrator optical system 521 includes an integrator element 523, a polarization conversion element 524, and a condenser lens 525.

The integrator element 523 includes a first fly-eye lens 526 and a second fly-eye lens 527. The first fly-eye lens 526 includes a plurality of microlenses arranged two-dimensionally. The second fly-eye lens 527 includes a plurality of microlenses arranged to correspond to the above-mentioned plurality of microlenses one by one.

The white light W2 incident on the integrator element 523 is divided into a plurality of light fluxes by the microlenses of the first fly-eye lens 526, and then imaged onto the respectively corresponding microlenses provided in the second fly-eye lens 527. The microlenses of the second fly-eye lens 527 each function as a secondary light source and emit a plurality of parallel light beams having uniform luminance to the subsequent polarization conversion element 524.

The polarization conversion element 524 has a function of unifying the polarization state of the incident light that is incident through the integrator element 523. Light passing through the polarization conversion element 524 is emitted to the illumination optical system 522 through the condenser lens 525.

The integrator optical system 521 has, as a whole, a function of adjusting the white light W2 from the optical filter 520 toward the illumination optical system 522 to have a uniform luminance distribution and adjusting it to be light in a uniform polarization state. The specific configuration of the integrator optical system 521 is not limited.

The illumination optical system 522 includes dichroic mirrors 530 and 531, mirrors 532, 533, and 534, field lenses 540R, 540G, and 540B, relay lenses 541 and 542, liquid crystal light valves 100 (liquid crystal light valves 100R, 100G, and 100B) that modulate the respective color light beams, and a dichroic prism 543.

The dichroic mirrors 530 and 531 have the property of selectively reflecting color light in a predetermined wavelength range and transmitting light in the other wavelength range. The dichroic mirror 530 selectively reflects green light G1 and blue light B1 included in the white light W2, and transmits red light R1 included in the white light W2. The dichroic mirror 531 selectively reflects the green light G1 reflected by the dichroic mirror 530, and transmits the blue light B1. As a result, different color light beams are separated in different optical paths. Note that there is no limitation on the configurations for respectively separating the color light beams of R, G, and B, devices to be used, and the like.

The separated red light R1 is reflected by the mirror 532, and after being collimated by the field lens 540R, enters the liquid crystal light valve 100R for modulating the red light. The green light G1 is collimated by the field lens 540G, and then enters the liquid crystal light valve 100G for modulating the green light. The blue light B1 passes through the relay lens 541 and is reflected by the mirror 533, and further passes through the relay lens 542 and is reflected by the mirror 534. The blue light B1 reflected by the mirror 534 is collimated by the field lens 540B and then enters the liquid crystal light valve 100B for modulating the blue light.

The liquid crystal light valves 100R, 100G, and 100B are each a liquid crystal display element of the transmission type, and are electrically connected to a signal source (not shown) (e.g., a PC) for supplying an image signal containing image information. For example, the liquid crystal light valve 100 is disposed between a pair of polarizing plates that are in a crossed Nicols state. The liquid crystal light valve 100 is capable of modulating the amount of light passing through each polarizing plate for each pixel by appropriately rotating the polarization direction of the transmitted light. Note that, in a configuration where light polarized in advance is incident, the polarizing plate on the incident side may not be provided.

The liquid crystal light valves 100R, 100G, and 100B modulate the incident light for each pixel on the basis of the image signal of each color supplied, to generate a red image, a green image, and a blue image, respectively. In this embodiment, the liquid crystal light valve 100 (100R, 100G, 100B) corresponds to a display element. The liquid crystal light valve 100 will be described in detail later.

The light of each color modulated by each liquid crystal light valve 100 (formed image) enters the dichroic prism 543 and is combined by the dichroic prism 543. The dichroic prism 543 superimposes and combines the light beams of the respective colors incident from the three directions, and emits the resultant light toward the projection system 512.

The projection system 512 projects an image generated by the liquid crystal light valves 100. The projection system 512 includes a plurality of lenses 545 or the like, and projects the light combined by the dichroic prism 543 on a screen or the like (not shown). In such a manner, the projection system 512 projects an image on the basis of the light beams modulated pixel by pixel by the liquid crystal light valves 100. As a result, a full-color image is displayed. The specific configuration of the projection system 512 is not limited. In this embodiment, the projection system corresponds to a projection optical system.

[Liquid Crystal Light Valve]

Figure 2:
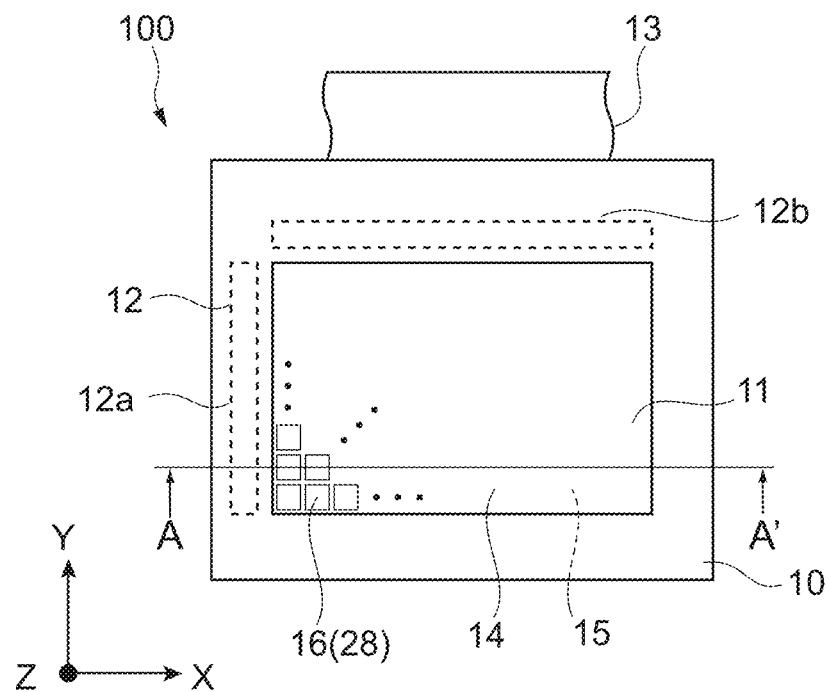
FIG. 2 is a schematic diagram showing a configuration example of a liquid crystal light valve.

FIG. 2 is a schematic diagram showing a configuration example of the liquid crystal light valve 100. The liquid crystal light valve 100 is configured, for example, as a module, and is incorporated in the image display apparatus 500. FIG. 2 schematically shows a plan view of the liquid crystal light valve 100 when viewed from the incident side where light is incident. The liquid crystal light valve 100 includes a package 10, a display region 11, a drive circuit 12, and external wiring 13.

The package 10 is a housing for storing the main body of the liquid crystal light valve 100. Windows for exposing the main body of the liquid crystal light valve 100 are provided on the incident side and the emission side of the package 10. Providing the package 10 makes it possible to easily modularize the liquid crystal light valve 100.

The display region 11 is a region that substantially contributes to display in the liquid crystal light valve 100. The display region 11 has a first surface 14 provided on the incident side and a second surface 15 provided on the emission side of the liquid crystal light valve 100. That is, it can also be said that the display region 11 is a region sandwiched between the first surface 14 and the second surface 15. The first surface 14 (the second surface 15) is typically a rectangle set to a predetermined aspect ratio. The window of the package 10 described above is formed so as to overlap with the first surface 14 (the second surface 15).

In the following, the direction parallel to the longitudinal direction (the horizontal direction in the drawing) of the first surface 14 will be described as the X direction, and the direction parallel to the lateral direction (the vertical direction in the drawing) of the first surface 14 will be described as the Y direction. Further, the direction perpendicular to the XY plane will be described as the Z direction.

As shown in FIG. 2, a plurality of pixels 16 is arranged in a grid shape along the X and Y directions in the display region 11. The plurality of pixels 16 is formed by a plurality of openings 28 as will be described later. Further, a plurality of data lines extending in the Y direction and a plurality of scanning lines extending in the X direction (not shown) are arranged in the display region 11. Each pixel 16 is arranged to correspond to the point of intersection of the data line and the scanning line. Further, a plurality of capacitance lines (not shown) is arranged parallel to the respective scanning lines in the display region 11.

For example, light incident on the first surface 14 of the display region 11 is modulated for each pixel 16 and is emitted from the second surface 15. The shape and size of the display region 11 (first surface 14 and second surface 15), the number of pixels (resolution of the image), and the like are not limited.

Figure 3:
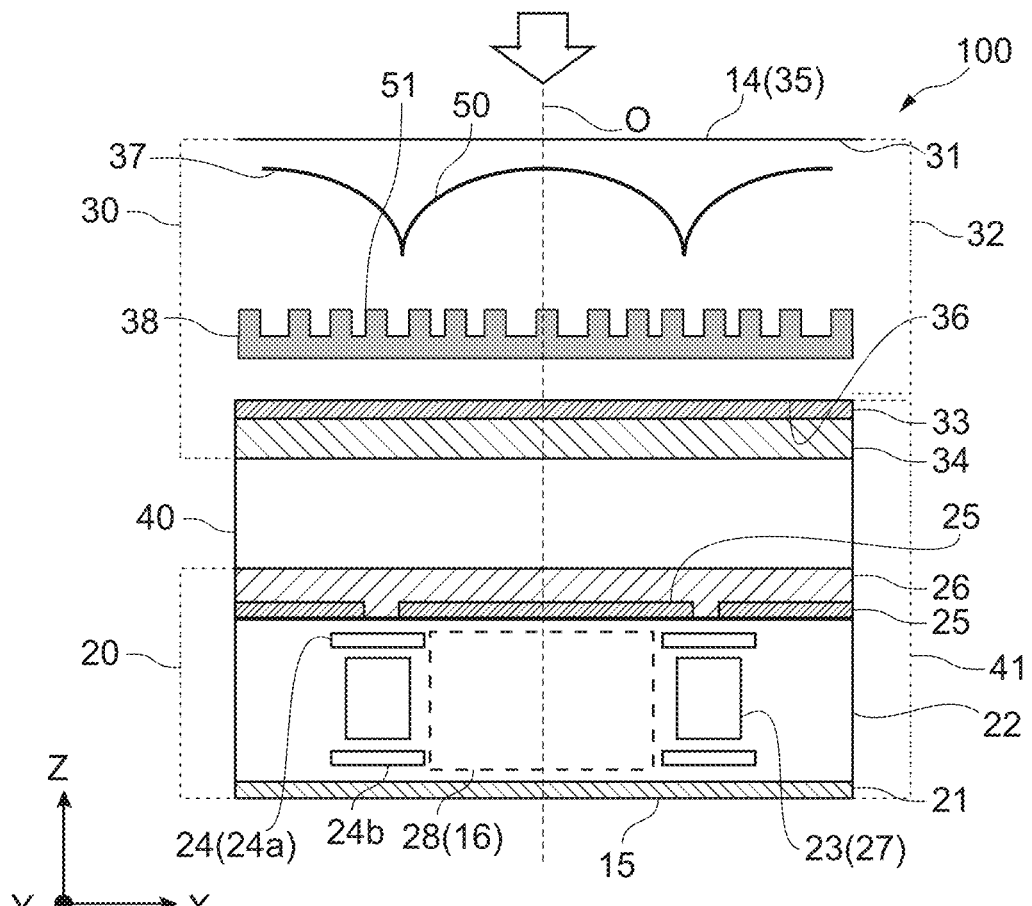
FIG. 3 is a cross-sectional view schematically showing the configuration example of the liquid crystal light valve.

The drive circuit 12 generates a signal for driving a control element 23 provided for each pixel 16 (see FIG. 3). The drive circuit 12 is formed in the main body of the liquid crystal light valve 100 so as to be outside the display region 11, for example. Further, the wiring of the drive circuit 12 is extended, and thus an external connection terminal (not shown) is formed. The external connection terminal is connected with the external wiring 13 of a flexible printed wiring board or the like. Using the external wiring 13, the main body of the liquid crystal light valve 100 and a signal source are electrically connected to each other.

The drive circuit 12 includes a scanning line drive circuit 12a and a data line drive circuit 12b. The data line drive circuit 12b supplies a signal voltage of an image signal corresponding to luminance information supplied from the signal source to the control element 23 that is provided for each pixel and selected via the signal line. The scanning line drive circuit 12a includes a shift register that sequentially shifts (transfers) a start pulse in synchronization with a clock pulse to be input, and the like. The scanning line drive circuit 12a performs, at the write of an image signal to each pixel 16, scanning thereon in units of rows and sequentially supplies the scanning signal to each scanning line.

FIG. 3 is a cross-sectional view schematically showing a configuration example of the liquid crystal light valve 100. FIG. 3 schematically shows a portion of the cross section of the display region 11 in the liquid crystal light valve 100 along the line AA' shown in FIG. 2. The liquid crystal light valve 100 further includes a control substrate 20, a counter substrate 30, and a liquid crystal layer 40 sandwiched between the control substrate 20 and the counter substrate 30. In this embodiment, the counter substrate 30 is disposed on the incident side of the liquid crystal light valve 100, and the control substrate 20 is disposed on the emission side thereof.

The control substrate 20 is bonded to the liquid crystal layer 40 and controls the modulation of light by the liquid crystal layer 40 for each pixel 16. The control substrate 20 includes a transparent substrate 21, a circuit layer 22, the control element 23, a light shielding portion 24, a pixel electrode 25, and an alignment film 26.

The transparent substrate 21 is, for example, a substrate having transparency and formed of quartz or glass. One surface of the transparent substrate 21 serves as an emission side (second surface 15) of the display region 11 described above. Further, the circuit layer 22 is formed on the side of the transparent substrate 21 opposite to the second surface 15.

The circuit layer 22 is a layer including the control element 23 and the light shielding portion 24. For example, the circuit layer 22 is formed of a transparent insulating film ($SiO_x$ film or amorphous silicon film) stacked in the process of forming the control element 23 and the light shielding portion 24. FIG. 3 schematically shows the planarized circuit layer 22, but the present technology is not limited thereto. The circuit layer 22 having irregularities in the thickness direction (Z direction) according to the shape of the control element 23 or the light shielding portion 24, or the like may be formed.

The control element 23 is an element that controls the liquid crystal layer 40 for each pixel 16. Specifically, the control element 23 controls the voltage applied to the pixel electrode 25 to be described later on the basis of the signal input to the scanning line and the data line. Typically, a thin film transistor (TFT 27) is used as the control element 23. The TFT 27 functions as a switching element.

The TFT 27 includes a source terminal, a drain terminal, and a gate terminal (not shown). The source terminal is connected to the data line, the drain terminal is connected to the pixel electrode 25 to be described later, and the gate terminal is connected to the scanning line. Further, a capacitor (not shown) is connected between the drain terminal (pixel electrode 25) and a capacitance line.

For example, a signal voltage corresponding to the luminance information (image signal) is supplied to the source terminal. Further, a scan signal is supplied to the gate terminal, and the TFT 27 is turned on only for a certain period. Thus, the signal voltage is applied to the pixel electrode 25 via the drain terminal. This signal voltage is held for a certain period by the capacitor. When the signal voltage is applied to the pixel electrode 25, the alignment state of the liquid crystal corresponding to the pixel 16 is changed. Thus, it is possible to modulate the light passing through the liquid crystal layer 40.

The light shielding portion 24 shields the TFT 27 serving as the control element 23 from light. The light shielding portion 24 is formed of, for example, a metal such as Al or Au, or another metal compound. The light shielding portion 24 may be also formed using the above-mentioned data lines, scanning lines, capacitance lines, or the like. In addition thereto, any material that blocks incident light may be used.

The light shielding portion 24 includes an incident-side light shielding layer 24a provided on the incident side of the TFT 27, and an emission-side light shielding layer 24b provided on the emission side of the TFT 27. The incident-side light shielding layer 24a and the emission-side light shielding layer 24b are formed so as to overlap the TFT 27 when viewed from the Z direction. Further, the incident-side light shielding layer 24a and the emission-side light shielding layer 24b may be configured to shield the capacitor, other wiring, or the like from light.

When the incident-side light shielding layer 24*a* and the emission-side light shielding layer 24*b* are provided, it is possible to block the light incident from the incident side and the emission side with respect to the TFT 27, wiring, or the like. Thus, it is possible to suppress a decrease in image quality due to malfunction or the like caused by the light incident on the TFT 27, wiring, or the like.

Further, the plurality of openings 28 each serving as the pixel 16 is formed in the light shielding portion 24. The opening 28 is a window provided in the light shielding portion 24 and is a portion capable of passing the incident light therethrough without blocking it. For example, as shown in FIG. 3, the windows for passing light are respectively formed on the incident-side light shielding layer 24*a* and the emission-side light shielding layer 24*b* so as to overlap with each other when viewed from the Z direction. The region between the windows is the opening 28. Note that the above-mentioned TFT 27 or the like is disposed around the opening 28.

In the light shielding portion 24 (circuit layer 22), the plurality of openings 28 is formed in a grid shape along the XY plane direction. Thus, the plurality of pixels 16 arranged in a grid shape is constituted. The shape, size, or the like of the opening 28 is not limited. For example, the shape, size, or the like of the opening 28 may be appropriately set in accordance with the size of the display region 11, the number of pixels, or the like.

The pixel electrode 25 is a transparent electrode disposed on the incident side of the circuit layer 22 to correspond to the pixel 16 (opening 28). The pixel electrode 25 is formed in a wider range than the opening 28 so as to cover the opening 28 when viewed from the Z direction, for example. As the pixel electrode 25, for example, a transparent conductive film formed of indium tin oxide (ITO), indium zinc oxide (IZO), or the like is used.

The alignment film 26 is formed on the incident side of the circuit layer 22 so as to cover the pixel electrode 25. The alignment film 26 is a film in which grooves for aligning liquid crystal included in the liquid crystal layer 40 are formed. With the direction of the grooves, for example, the alignment direction of the liquid crystal in a state where no voltage is applied is set. For example, a polyimide resin, $SiO_2$, or the like in which grooves for alignment are formed is used as the alignment film 26. In addition, the specific configuration of the alignment film 26 is not limited.

The counter substrate 30 includes a transparent substrate 31, a lens layer 32, a common electrode 33, and an alignment film 34. The transparent substrate 31 is a substrate having transparency and formed of quartz or glass. One surface of the transparent substrate 31 serves as an incident side (first surface 14) of the display region 11 described above. Further, the lens layer 32 is formed by processing the transparent substrate 31 on the side of the transparent substrate 31 opposite to the first surface 14. Therefore, it can also be said that the transparent substrate 31 is a substrate constituting the incident side of the lens layer 32.

The lens layer 32 has an incident surface 35, an emission surface 36, a refractive lens array 37, and a diffractive lens array 38. The incident surface 35 is a surface where light is incident, and is a surface directed toward the incident side of the lens layer 32. In this embodiment, the first surface 14 of the transparent substrate 31 is the incident surface 35 of the lens layer 32. The emission surface 36 is a surface opposite to the incident surface 35. In this embodiment, the lens layer 32 is disposed facing the liquid crystal layer 40 with the emission surface 36 facing the liquid crystal layer 40.

The refractive lens array 37 is a lens array in which a plurality of refractive lenses 50 is arranged two-dimensionally. Specifically, the plurality of refractive lenses 50 is arranged in a grid shape along the XY plane so as to overlap with the plurality of openings 28 (the plurality of pixels 16) when viewed from the Z direction.

In the example shown in FIG. 3, the refractive lens array 37 is disposed on the incident surface 35 side of the lens layer 32. That is, the refractive lens array 37 is formed on the emission side of the transparent substrate 31. For example, a concave portion is formed on the emission side of the transparent substrate 31 and is filled with a transparent material having a refractive index different from that of the transparent substrate 31, so that the refractive lens 50 is configured.

The transparent material constituting the refractive lens 50 is not limited. For example, when the transparent substrate 31 is formed of $SiO_2$ or the like, a transparent material having a higher refractive index than that of the transparent substrate 31 such as SiON or $Al_2O_3$ is used. Of course, a transparent material having a lower refractive index than that of the transparent substrate 31 may be used. In addition, any material having a refractive index different from that of the transparent substrate 31 may be used.

The diffractive lens array 38 is a lens array in which a plurality of diffractive lenses 51 is arranged two-dimensionally. Specifically, the plurality of diffractive lens 51 is arranged in a grid shape along the XY plane so as to overlap with the plurality of openings 28 (the plurality of pixels 16) when viewed from the Z direction. That is, the plurality of diffractive lenses 51 is disposed facing the plurality of refractive lenses 50 of the refractive lens array 37.

In the example shown in FIG. 3, the diffractive lens array 38 is disposed on the emission surface 36 side of the lens layer 32. For example, after the refractive lens array 37 is formed, the emission side of the refractive lens array 37 is planarized. A predetermined diffraction pattern is formed on the planarized surface by using materials having refractive indices different from each other, so that the diffractive lenses 51 are formed.

The materials constituting the diffractive lenses 51, or the like are not limited. For example, it is possible to use silicon dioxide ($SiO_2$), silicon nitride (SiN), a metal oxide film ($TiO_2$, $Nb_2O_3$, $Ta_2O_5$, or $ZrO_2$), or the like as the materials having different refractive indices. In addition, it is possible to form the diffractive lenses 51 by combination of any materials having different refractive indices. The specific configuration of the diffractive lenses 51 will be described below in detail.

In such a manner, the lens layer 32 includes the plurality of refractive lenses 50 disposed for each pixel 16, and the plurality of diffractive lenses 51 disposed for each pixel 16 while facing the plurality of refractive lenses 50. That is, it can be said that a pair of microlenses formed of the refractive lens 50 and the diffractive lens 51 is formed in the lens layer 32 to correspond to one pixel 16.

The common electrode 33 is a transparent electrode formed so as to cover the emission surface 36 of the lens layer 32. The common electrode 33 functions as a common electrode for all of the pixels 16 and is connected to GND or the like, for example. A voltage is applied to the liquid crystal layer 40 by the common electrode 33 and the pixel electrode 25 described above. As the common electrode 33, for example, a transparent conductive film of ITO, IZO, or the like is used.

The alignment film 34 is formed on the emission side of the common electrode 33 so as to cover the common electrode 33. The alignment film 34 typically includes grooves for aligning the liquid crystal in a direction perpendicular to the grooves engraved in the alignment film 26 on the opposite side across the liquid crystal layer 40. Thus, in a state where a voltage is not applied, it is possible to rotate the polarization direction of the incident light by 90°. For example, a polyimide resin, $SiO_2$, or the like in which grooves for alignment are formed is used as the alignment film 34.

The liquid crystal layer 40 is formed by providing the liquid crystal between the control substrate 20 and the counter substrate 30. For example, in a state where the control substrate 20 and the counter substrate 30 are disposed with a predetermined space therebetween, the substrates are bonded to each other via a sealing material (not shown) or the like. Liquid crystal is then enclosed in a space surrounded by the control substrate 20, the counter substrate 30, and the sealing material. The type or the like of the liquid crystal material constituting the liquid crystal layer 40 is not limited. Nematic liquid crystal, cholestic liquid crystal, or the like may be used as appropriate.

In the liquid crystal constituting the liquid crystal layer 40, the alignment and order of molecular aggregation are changed in accordance with a voltage to be applied. Thus, the liquid crystal layer 40 is capable of modulating incident light. Note that the voltage to be applied to the liquid crystal layer 40 is controlled for each pixel 16 by each pixel electrode 25 with reference to the common electrode 33. Thus, gradation display with the light intensity changed for each pixel 16 becomes possible.

In this embodiment, the control substrate 20, the liquid crystal layer 40, and the alignment film 34 and the common electrode 33 provided on the counter substrate 30 constitute an optical control layer 41 that modulates incident light for each pixel 16. That is, it can be said that the liquid crystal light valve 100 has a configuration in which the lens layer 32 and the optical control layer 41 are bonded to each other.

Further, as described above, the pair of the refractive lens 50 and the diffractive lens 51 is arranged for each pixel in the lens layer 32. Thus, the lens layer 32 emits light that is incident from the incident surface 35 and passes through the refractive lens 50 and the diffractive lens 51 to the optical control layer 41. In other words, the light whose light path is controlled by refraction and diffraction enters the optical control layer 41. Hereinafter, the characteristics of the refractive lens 50 and the diffractive lens 51 will be described in detail.

Figure 4A:
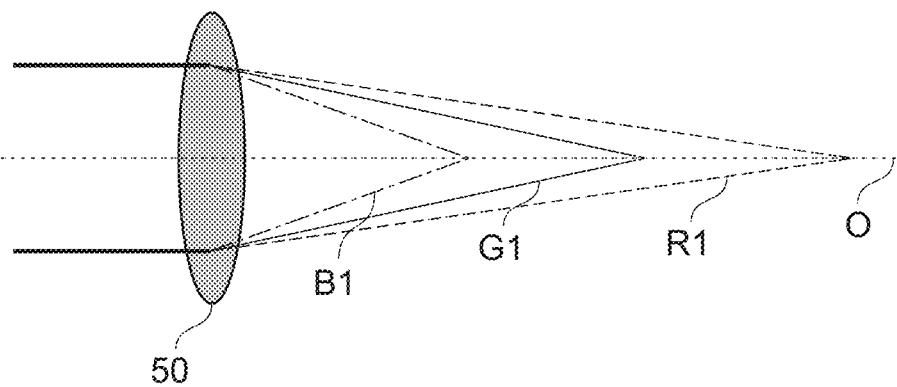
FIGS. 4A and 4B are schematic diagrams for describing the characteristics of a refractive lens and a diffractive lens.
Figure 4B:
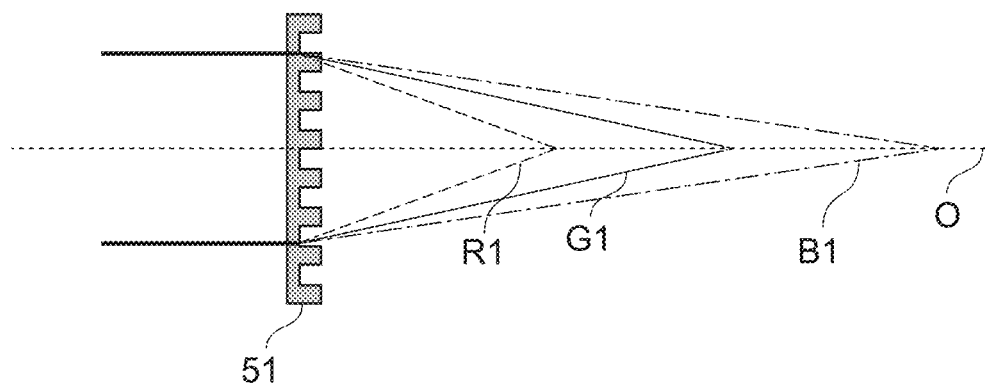

FIGS. 4A and 4B are schematic diagrams for describing the characteristics of the refractive lens 50 and the diffractive lens 51. FIG. 4A schematically shows an example of an optical path of light incident on the refractive lens 50 that refracts light. Further, FIG. 4B schematically shows an example of an optical path of light incident on the diffractive lens 51 that diffracts light. Note that the refractive lens 50 and the diffractive lens 51 both have a positive refractive index and respectively refracts and diffracts light so as to condense the light.

In general, when light is refracted, as the wavelength of the light becomes longer, its refraction angle becomes smaller. For example, as shown in FIG. 4A, when white light is incident parallel to the optical axis O of the refractive lens 50, the refraction angles of the blue light B1 (solid line), the green light G1 (dotted line), and the red light R1 (dashed line) included in the white light decrease in this order. As a result, the blue light B1 is focused at a position closest to the refractive lens 50, and the red light R1 is focused at a position farthest from the refractive lens 50. Further, the focal point of the green light G1 is formed between the focal points of the blue light B1 and the red light R1.

Also, when light is diffracted, as the wavelength of the light becomes longer, its diffraction angle becomes larger. For example, as shown in FIG. 4B, when white light is incident parallel to the optical axis O of the diffractive lens 51, the diffraction angles of the blue light B1 (solid line), the green light G1 (dotted line), and the red light R1 (dashed line) included in the white light increase in this order. As a result, the blue light B1 is focused at a position farthest from the refractive lens 50, and the red light R1 is focused at a position closest to the refractive lens 50. Further, the focal point of the green light G1 is formed between the focal points of the blue light B1 and the red light R1.

In such a manner, when light is refracted or diffracted, the bending angle (refraction angle or diffraction angle) at which the light is bent for each wavelength (color) of the light is deviated, and thus the focal position of each color light beam is deviated, i.e., chromatic aberration occurs. Thus, in a configuration to control the optical path of the light by using only the lens that refracts (diffracts) light, it may be impossible to appropriately perform condensing or the like of light due to the influence of chromatic aberration (see FIGS. 13A, 13B, and 13C).

Meanwhile, as shown in FIGS. 4A and 4B, the case where light is refracted and the case where light is diffracted have the opposite relationship in the deviation of the bending angle with respect to the wavelength. Therefore, when such a difference in refraction angle with respect to the wavelength is used, and the refractive lens 50 using refraction and the diffractive lens 51 using diffraction are appropriately combined, it is possible to achieve highly efficient condensing characteristics independent of the wavelength.

Figure 5A:
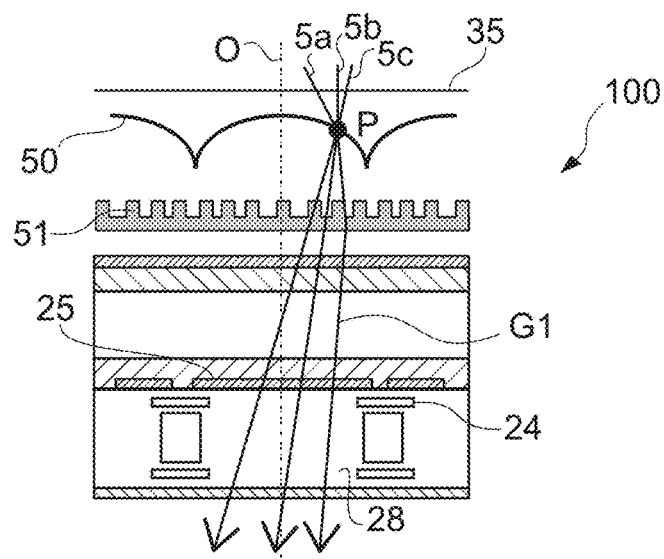
FIGS. 5A, 5B and 5C are schematic diagrams showing an example of an optical path of light incident on the liquid crystal light valve.
Figure 5B:
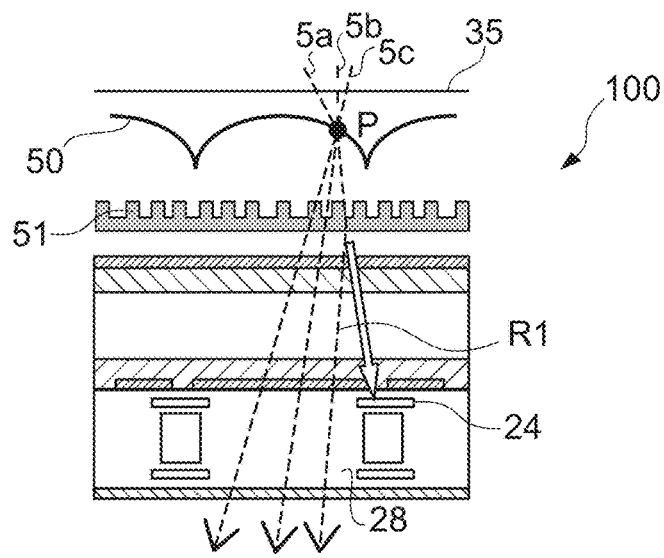
Figure 5C:
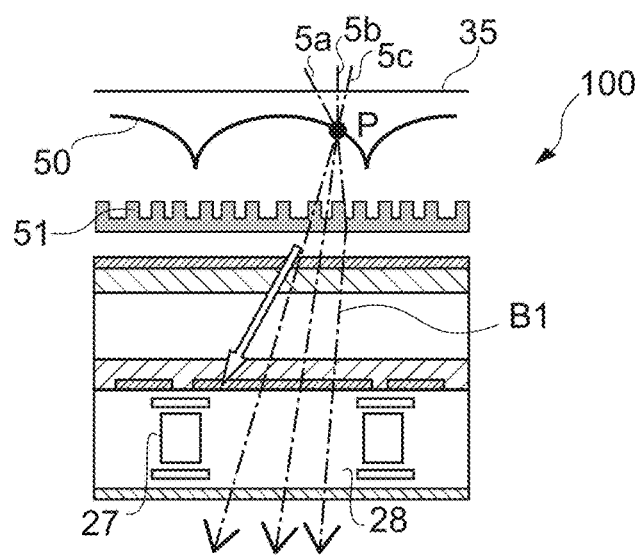

FIGS. 5A, 5B, and 5C are schematic diagrams showing an example of an optical path of light incident on the liquid crystal light valve. FIGS. 5A, 5B, and 5C schematically shows an example of the optical path of each type light beam of the green light G1, the red light R1, and the blue light B1 incident on the liquid crystal light valve 100. Note that in FIGS. 5A, 5B, and 5C illustrations of the refraction or the like that occurs at an interface or the like other than the refractive lens 50 and the diffractive lens 51 are omitted.

In this embodiment, the refractive lens 50 and the diffractive lens 51 collect the light incident on the incident surface 35 and pass the light through the opening. That is, the refractive lens 50 and the diffractive lens 51 condense the light incident on the liquid crystal light valve 100 and emit the light so as not to be blocked by the light shielding portion 24 or the like. This makes it possible to sufficiently enhance the light utilization efficiency.

Further, in this embodiment, the refractive lens 50 and the diffractive lens 51 are configured such that the aberration (chromatic aberration) of the refractive lens 50 is corrected by the diffractive lens 51. For example, the refractive lens 50 and the diffractive lens 51 are configured such that the focal position of the light incident from the incident surface 35 and passing through the refractive lens 50 and the diffractive lens 51 is constant irrespective of the wavelength of the light. Note that the focal position is set, for example, at the center of the opening 28.

The focal position, interval, and the like of the refractive lens 50 and the diffractive lens 51 are not limited. For example, each lens may be appropriately configured such that the light incident from the incident surface 35 can pass through a corresponding opening 28. Further, the lens layer 32 may appropriately include, in addition to the refractive lens 50 and the diffractive lens 51, a space or the like for adjusting the focal position or the like.

In FIG. 5A, the green light beams G1 are incident on an incident position P of the refractive lens 50 along first to third optical paths 5a to 5c. The first optical path 5a is an optical path inclined with respect to the optical axis O from the center of the refractive lens 50 toward the peripheral edge (from the left side to the right side in the figure). The second optical path 5b is an optical path parallel to the optical axis O. The third optical path 5c is an optical path inclined with respect to the optical axis O from the periphery of the refractive lens 50 toward the center (from the right side to the left side in the figure).

The green light beams G1 incident along the respective optical paths 5a to 5b are, after being refracted by the refractive lens 50, diffracted by the diffractive lens 51, and then enter the liquid crystal layer 40. Each of the green light beams G1 passing through the liquid crystal layer 40 enters the opening 28 through the pixel electrode 25 and passes through the opening 28 as it is.

In FIG. 5B, the red light beams R1 are incident on the incident position P of the refractive lens 50 along the first to third optical paths 5a to 5c similar to FIG. 5A. The red light beams R1 incident along the respective optical paths 5a to 5c are refracted by the refractive lens 50 and then diffracted by the diffractive lens 51 so as to pass through the opening 28.

Here, attention is paid to the red light beam R1 incident along the first optical path 5a. For example, as shown by a white arrow in FIG. 5B, if the diffraction angle at the diffractive lens 51 is small, the red light beam R1 incident along the first optical path 5a may enter the light shielding portion 24 (incident-side light shielding layer 24a) on the right side of the opening 28. In this case, there is a possibility that the condensing efficiency is lowered. In practice, since the diffractive lens 51 is capable of bending the optical path of the red light R1 having a long wavelength to be sufficiently large, the red light beam R1 incident along the first optical path 5a can also pass through the opening 28.

In FIG. 5C, the blue light beams B1 are incident on the incident position P of the refractive lens 50 along the first to third optical paths 5a to 5c similar to FIG. 5A. The blue light beams B1 incident along the respective optical paths 5a to 5c are refracted by the refractive lens 50 and then diffracted by the diffractive lens 51 so as to pass through the opening 28.

Here, attention is paid to the blue light beam B1 incident along the third optical path 5c. For example, as shown by a white arrows in FIG. 5C, if the diffraction angle at the diffractive lens 51 is large, the blue light beam B1 incident along the third optical path 5c may enter the TFT 27 on the left side of the opening 28. In this case, there is a possibility that malfunction or the like of the TFT 27 occurs together with the lowering of the condensing efficiency. In practice, since the diffractive lens 51 is capable of bending the optical path of the blue light B1 having a short wavelength to be sufficiently small, the blue light beam B1 incident along the third optical path 5c can also pass through the opening 28.

In such a manner, the refractive lens 50 that refracts light and the diffractive lens 51 that diffracts light are combined, and thus it is possible to sufficiently suppress the reduction of light utilization efficiency, the malfunction of the TFT 27, or the like due to the chromatic aberration. As a result, it is possible for the liquid crystal light valve 100 to accurately emit bright light modulated for each pixel 16, and to achieve bright and high-quality image display.

Note that, in FIGS. 5A, 5B, and 5C, the optical paths of the green light G1, the red light R1, and the blue light B1 are described using substantially the same optical paths for the sake of simplicity. Actually, each color light beam travels along an optical path corresponding to a wavelength. Even in this case, the deviation or the like of the optical path of each color light beam is corrected by using a combination of refraction and diffraction of light, and the light incident on the light shielding portion 24, the TFT 27, or the like can be sufficiently reduced.

Figure 6:
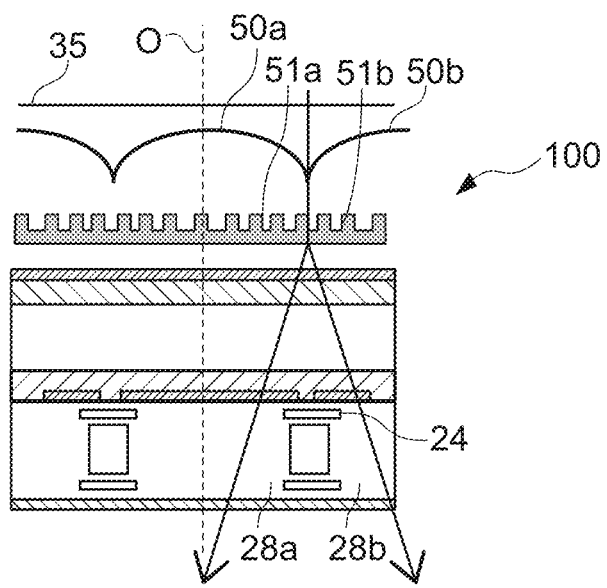
FIG. 6 is a schematic diagram showing another example of an optical path of light incident on the liquid crystal light valve.

FIG. 6 is a schematic diagram showing another example of the optical path of the light incident on the liquid crystal light valve 100. FIG. 6 schematically shows the optical path in the case where the light is incident parallel to the optical axis O on a boundary portion of the refractive lenses 50 adjacent to each other.

Hereinafter, the opening 28 disposed at the center in the drawing is referred to as a first opening 28a, and the opening 28 on the right side of the first opening 28a is referred to as a second opening 28b. Further, the refractive lens 50 and the diffractive lens 51 disposed to correspond to the first opening 28a are referred to as a first refractive lens 50a and a first diffractive lens 51a, respectively. Further, the refractive lens 50 and the diffractive lens 51 disposed to correspond to the second opening 28b are referred to as a second refractive lens 50b and a second diffractive lens 51b, respectively.

In FIG. 6, light is incident parallel to the optical axis O on the boundary portion of the first and second refractive lenses 50a and 50b. The light incident on the boundary portion of the refractive lenses 50a and 50b travels straight almost without undergoing refraction, and enters the boundary portion of the first and second diffractive lenses 51a and 51b.

In this embodiment, the diffraction grating is formed at the boundary portion of the diffractive lenses 51 adjacent to each other. That is, the boundary portion of the first and second diffractive lenses 51a and 51b is a diffraction grating. The diffraction grating is configured to, for example, divide the incident light and emit it to the first and second openings 28a and 28b. Note that it is possible to set the division ratio of the light or to emit light to one of the first and second openings 28a and 28b by appropriately forming the diffraction grating.

Thus, in the lens layer 32, the light incident on the boundary portion of the first and second diffractive lenses 51a and 51b is emitted toward at least one of the first opening 28 or the second opening 28.

For example, when the diffraction grating or the like is not provided, the light incident on the boundary portion of the refractive lenses 50 may travel straight as it is and be blocked by the light shielding portion 24. In contrast, in this embodiment, even the light incident on the boundary portion of the refractive lenses 50 can change the ray angle (optical path) by the effect of the diffractive lens 51 disposed thereafter. This makes it possible to reduce the light blocked and to improve the light utilization efficiency.

Figure 7:
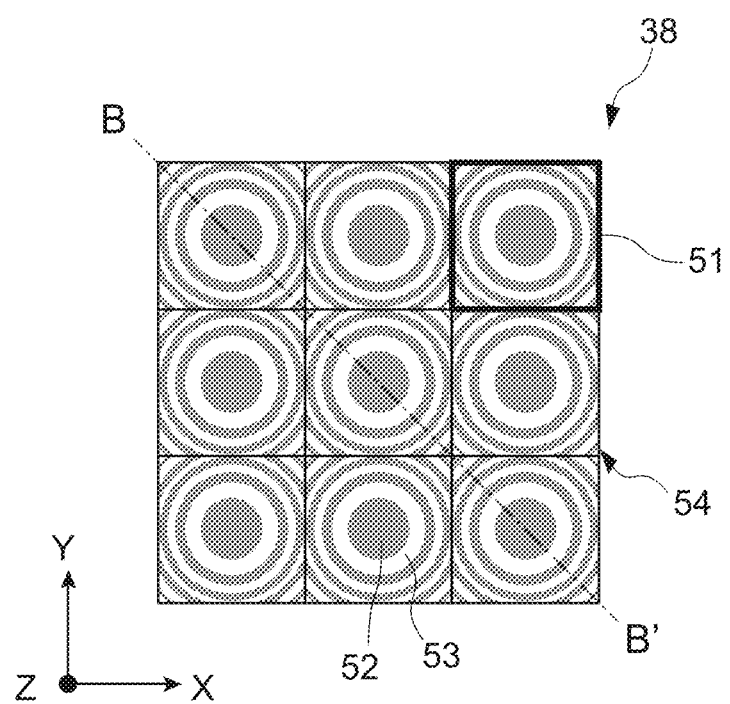
FIG. 7 is a schematic diagram showing an example of an arrangement pattern of the diffractive lens.

FIG. 7 is a schematic diagram showing an example of an arrangement pattern of the diffractive lenses 51. FIG. 7 shows 3×3 diffractive lenses 51 arranged in a grid shape (diffractive lens array 38) when viewed from the incident surface 35. As described with reference to FIG. 3, the diffractive lens 51 is formed using materials having refractive indices different from each other. In this embodiment, the diffractive lens 51 is configured using a high refractive index layer 52 having a high refractive index and a low refractive index layer 53 having a refractive index lower than that of the high refractive index layer 52.

Note that the high refractive index layer 52 is a layer having a relatively high refractive index, and the low refractive index layer 53 is a layer having a relatively low refractive index. Examples of the high refractive index layer 52 and the low refractive index layer 53 include SiN (refractive index n=2.0) and SiO$_2$ (refractive index n=1.46). Of course, the present technology is not limited to this.

In FIG. 7, the high refractive index layer 52 of the refractive lens 50 is shown in the gray region, and the low refractive index layer 53 is shown in the white region. As shown in FIG. 7, the diffractive lens 51 is configured such that the high refractive index layer 52 and the low refractive index layer 53 are alternately disposed in the transverse direction with respect to the optical axis O (Z-axis direction). That is, the diffractive lens 51 has a diffraction pattern 54 in which the high refractive index layer 52 and the low refractive index layer 53 are alternately arranged in a plane direction (XY plane direction) parallel to the incident surface 35.

When the high refractive index layer 52 and the low refractive index layer 53 are alternately arranged, a phase difference occurs between the layers, so that the diffractive lens 51 can be easily configured. Note that, as will be described below, since an arrangement in which a target phase difference is generated only needs to be formed between the layers, the positional relationship between the high refractive index layer 52 and the low refractive index layer 53 may be interchanged.

FIGS. 8A, 8B, 8C, 8D, 9A, 9B, 9C, and 9D are cross-sectional views schematically showing a configuration example of the diffractive lens. FIGS. 8A, 8B, 8C, 8D, FIGS. 9A, 9B, 9C, and 9D schematically show examples of a cross section along the line BB' for obliquely cutting the arrangement pattern of the 3×3 diffractive lenses 51 shown in FIG. 7. Each figure includes a cross-section of the three diffractive lenses 51 respectively corresponding to the three pixels 16.

Figure 8A:
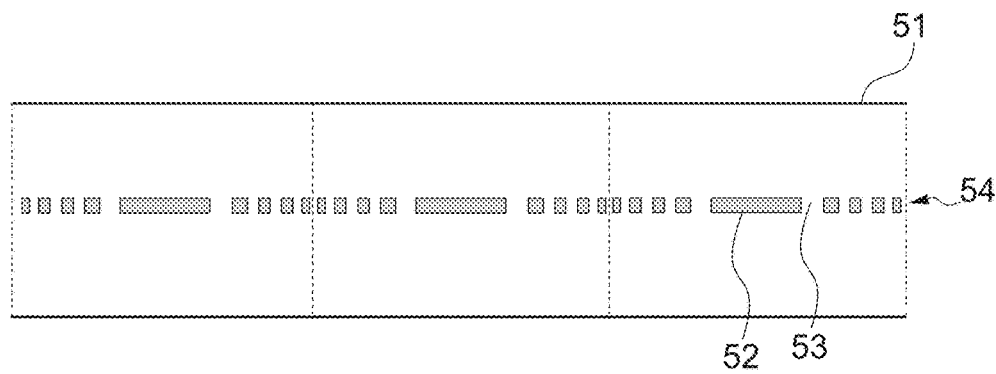
FIGS. 8A, 8B, 8C, and 8D are cross-sectional views schematically showing configuration examples of the diffractive lens.
Figure 8B:
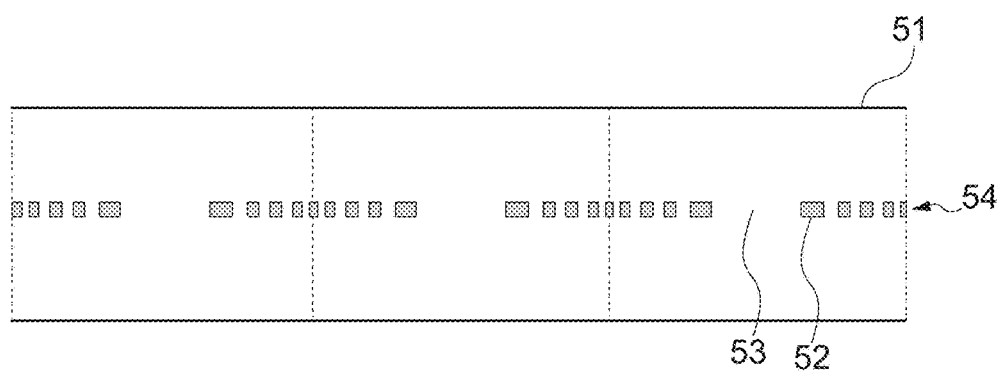

In FIGS. 8A and 8B, the diffractive lens 51 is formed by embedding the high refractive index layer 52 in the low refractive index layer 53. That is, the diffractive lens 51 is constituted by an island-shaped high refractive index layer 52 formed in the low refractive index layer 53.

In the diffraction pattern 54 shown in FIG. 8A, the high refractive index layer 52 is formed at the center of the pattern. In this case, since the phase of the light is delayed at the center of the pattern relative to the adjacent portions, it is possible to achieve a condensing effect of condensing the incident light.

The diffraction pattern 54 shown in FIG. 8B is a pattern obtained by inverting the positional relationship between the high refractive index layer 52 and the low refractive index layer 53 in the diffraction pattern 54 shown in FIG. 8B, and the low refractive index layer 53 is formed at the center of the pattern. In this case, since the phase of the light progresses at the center of the pattern relative to the adjacent portions, it is possible to achieve a divergent effect of diverging the incident light.

Figure 8C:
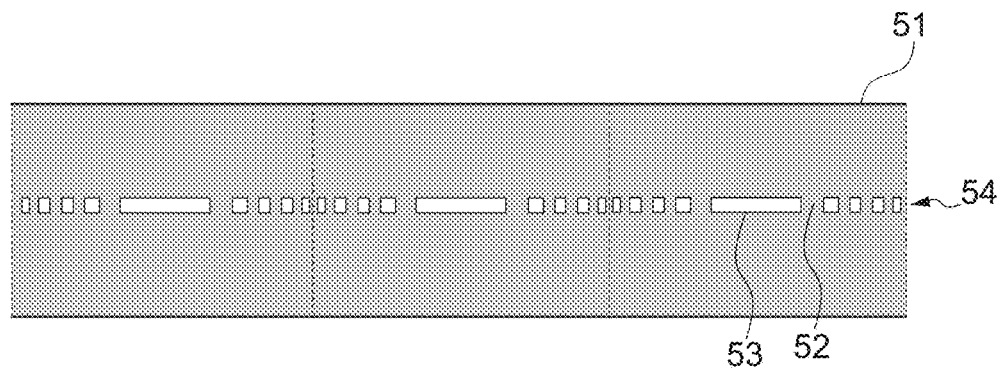
Figure 8D:
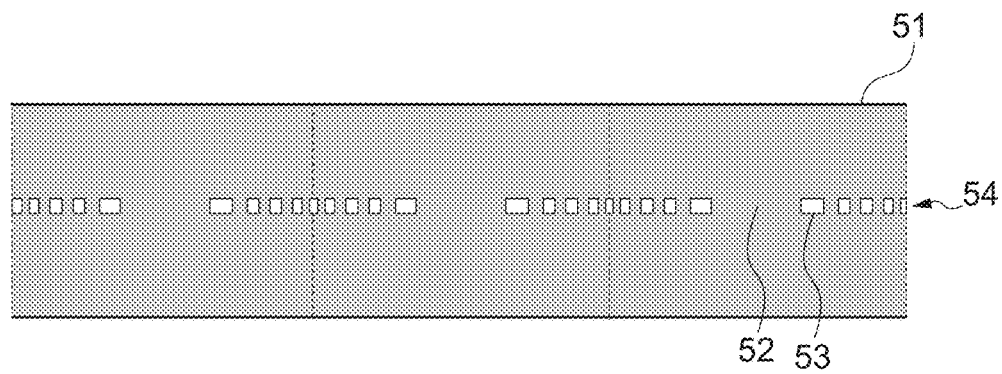

In FIGS. 8C and 8D, the diffractive lens 51 is formed by embedding the low refractive index layer 53 in the high refractive index layer 52. That is, the diffractive lens 51 is constituted by an island-shaped low refractive index layer 53 formed in the high refractive index layer 52.

In the diffraction pattern 54 shown in FIG. 8C, the low refractive index layer 53 is formed at the center of the pattern. In this case, since the phase of the light progresses at the center of the pattern relative to the adjacent portions, it is possible to achieve a divergent effect of diverging the incident light.

The diffraction pattern 54 shown in FIG. 8D is a pattern obtained by inverting the positional relationship between the high refractive index layer 52 and the low refractive index layer 53 in the diffraction pattern 54 shown in FIG. 8C, and the high refractive index layer 52 is formed at the center of the pattern. In this case, since the phase of the light is delayed at the center of the pattern relative to the adjacent portions, it is possible to achieve a condensing effect of condensing the incident light.

In FIGS. 9A, 9B, 9C, and 9D, the diffractive lenses are formed at the junction of the high refractive index layer 52 and the low refractive index layer 53. For example, an unevenness corresponding to the diffraction pattern 54 is formed on the surface of one of the layers, and the other layer is formed so as to fill the unevenness. That is, it can be said that the diffractive lens 51 is formed in a state where the two layers of the high refractive index layer 52 and the low refractive index layer 53 are engaged with each other.

Figure 9A:
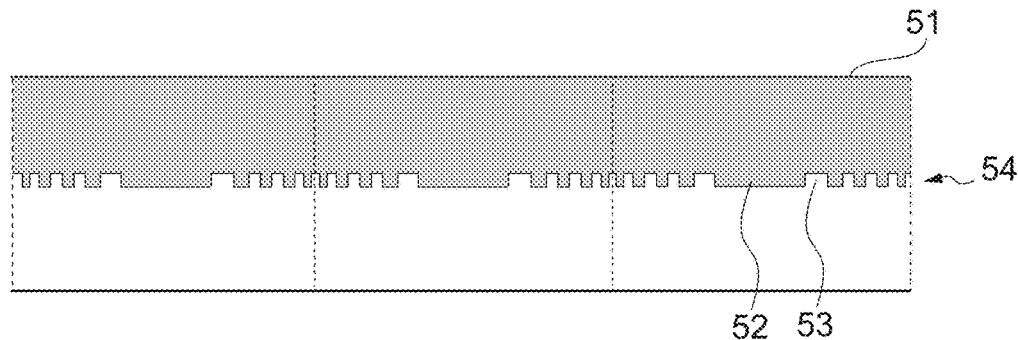
FIGS. 9A, 9B, 9C, and 9D are cross-sectional views schematically showing configuration examples of the diffractive lens.

In FIG. 9A, the high refractive index layer 52 is disposed on the incident side and the low refractive index layer 53 is disposed on the emission side. Further, the high refractive index layer 52 is formed at the center of the pattern. In this case, since the phase of the light is delayed at the center of the pattern relative to the adjacent portions, it is possible to achieve a condensing effect of condensing the light incident.

Figure 9B:
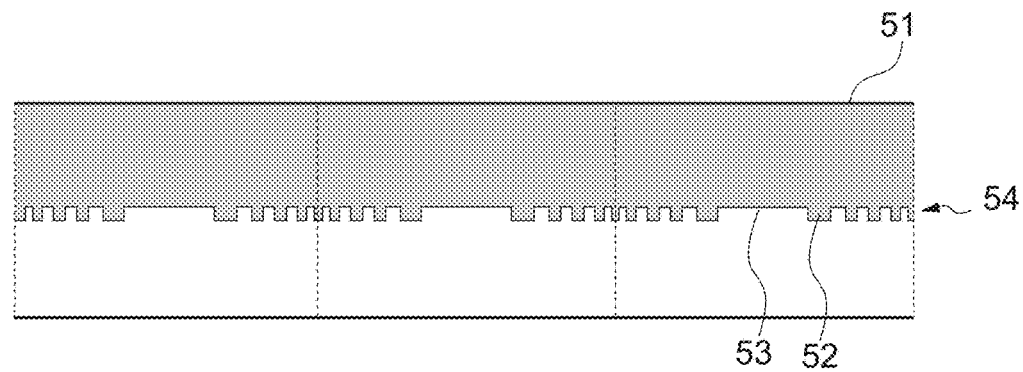

The diffraction pattern 54 shown in FIG. 9B is a pattern obtained by inverting the positional relationship between the high refractive index layer 52 and the low refractive index layer 53 in the diffraction pattern 54 (junction) shown in FIG. 9A, and the low refractive index layer 53 is formed at the center of the pattern. In this case, since the phase of the light progresses at the center of the pattern relative to the adjacent portions, it is possible to achieve a divergent effect of diverging the light incident.

Figure 9C:
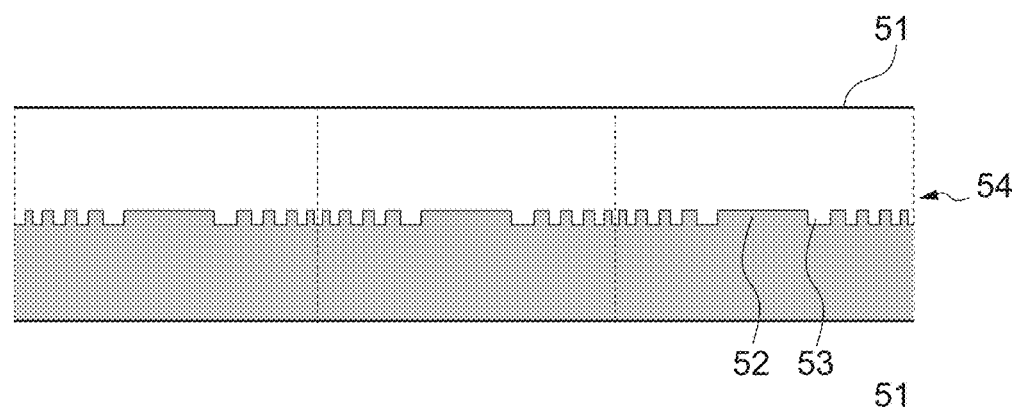

In FIG. 9C, the low refractive index layer 53 is disposed on the incident side and the high refractive index layer 52 is disposed on the emission side. Further, the high refractive index layer 52 is formed at the center of the pattern. In this case, since the phase of the light is delayed at the center of the pattern relative to the adjacent portions, it is possible to achieve a condensing effect of condensing the light incident.

Figure 9D:
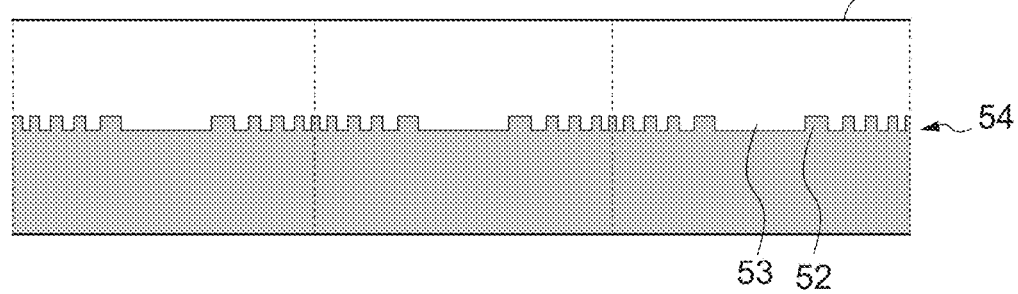

The diffraction pattern 54 shown in FIG. 9D is a pattern obtained by inverting the positional relationship between the high refractive index layer 52 and the low refractive index layer 53 in the diffraction pattern 54 (junction) shown in FIG. 9C, and the low refractive index layer 53 is formed at the center of the pattern. In this case, since the phase of the light progresses at the center of the pattern relative to the adjacent portions, it is possible to achieve a divergent effect of diverging the light incident.

Figure 10:
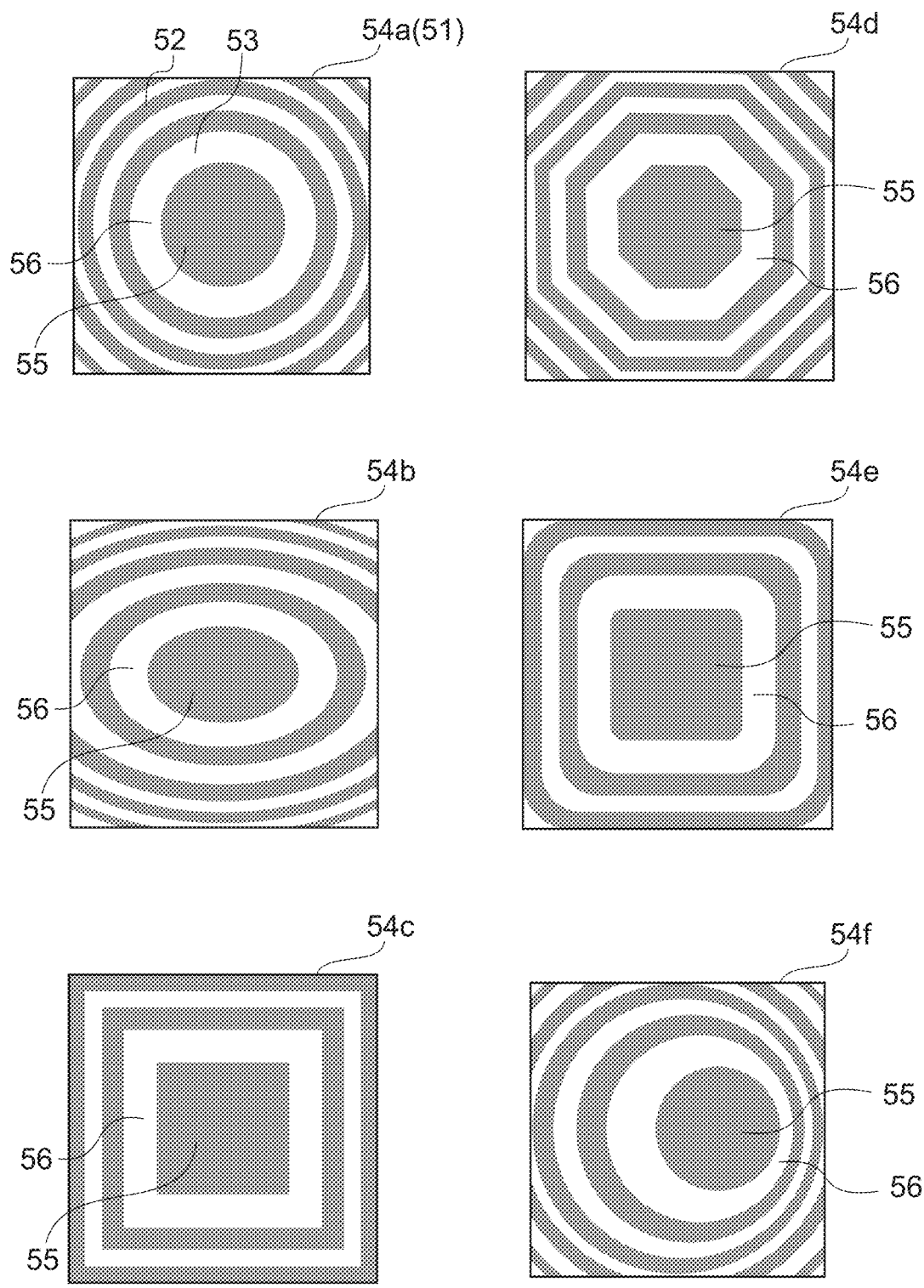
FIG. 10 is a schematic diagram showing examples of a diffraction pattern of the diffractive lens.

FIG. 10 is a schematic diagram showing examples of the diffraction pattern 54 of the diffractive lens 51. FIG. 10 shows diffraction patterns 54a to 54f of a single diffractive lens 51 when viewed from the incident surface 35. Each of the diffraction patterns 54a to 54f includes, when viewed from the incident surface 35, a central region 55 serving as the center of the pattern and a plurality of strip-shaped regions 56 concentrically arranged around the central region 55. Thus, it is possible to alternately arrange the low refractive index layer 53 and the high refractive index layer 52 in the transverse direction with respect to the optical axis O. Further, it is possible to easily implement a function of condensing or diverging the light with reference to the optical axis O, or the like.

The central region 55 of the diffraction pattern 54a is circular. The circular central region 55 is disposed so as to overlap the center of the pixel 16 (opening 28), for example. Further, the plurality of arcuate strip-shaped regions 56 concentrically arranged is formed around the central region 55. Note that the diffraction pattern 54a is a pattern similar to the diffraction pattern 54 shown in FIG. 7. Using such a circular pattern, it is possible to enhance the condensing accuracy.

The central region 55 of the diffraction pattern 54b is elliptical, and the plurality of strip-shaped regions 56 having an elliptical outer shape is formed therearound. Using an elliptical pattern, it is possible to condense light in an elongated region, for example. Thus, it is possible to enhance the condensing efficiency in accordance with the shape of the opening 28.

The central region 55 of the diffraction patterns 54c and 54d is a polygon, and the plurality of strip-shaped regions 56 having an outer shape similar to that of the central region 55 is formed therearound. The rectangle shape is used in the diffraction pattern 54c. Thus, for example, it is possible to constitute a diffractive lens that condenses light in the rectangle shape, and to improve the luminance unevenness or the like. The octagon shape is used in the diffraction pattern 54d. Thus, it is possible to form the diffraction pattern 54 using any polygon.

The central region 55 of the diffraction pattern 54e is a rounded-corner polygon having rounded corners (rectangle). When the corners of the polygon are thus rounded, for example, it is possible to suppress interference of light at the edge or the like, and to accurately condense the light. In such a manner, a circle, an ellipse, a polygon, a rounded-corner polygon, or the like is used as the shape of the diffraction pattern 54 in panel plan view. Of course, the diffraction pattern 54 is not limited to this, and a diffraction pattern 54 having any shape may be used.

The central region 55 of the diffraction pattern 54f is disposed out of the center of the range in which the diffractive lens 51 is provided. That is, the central region 55 is disposed eccentrically with respect to the center of the opening 28 when viewed from the incident surface 35. In the example shown in FIG. 10, the diffraction pattern 54f is formed in a state where the circular central region 55 is deviated from the center of the pattern to the right side in the drawing. Therefore, on the right side of the central region 55, the distance between the high refractive index layer 52 and the low refractive index layer 53 is shortened, and on the left side, the distance between the layers is widened.

Therefore, in the diffraction pattern 54f, the light incident on the right side is bent at a large diffraction angle as compared with the light incident on the left side. For example, it is assumed that in the periphery of the display region 11 (the periphery of the first surface 14), the angle of light incident on the incident surface 35 deviates from the optical axis O. Even in such a case, by using an eccentric pattern like the diffraction pattern 54f, it is possible to diffract the incident light in a desired direction. Thus, it is possible to sufficiently avoid such a situation that the luminance is reduced at the periphery.

Figure 11:
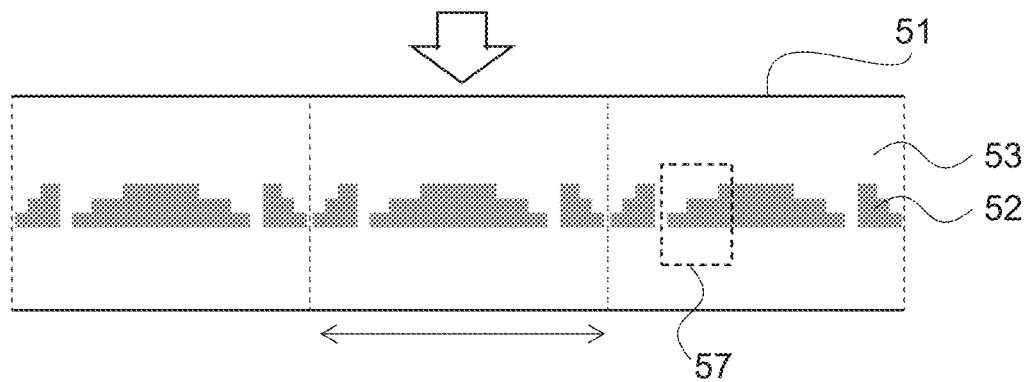
FIG. 11 is a cross-sectional view schematically showing another configuration example of the diffractive lens.

FIG. 11 is a cross-sectional view schematically showing another configuration example of the diffractive lens 51. The diffractive lens 51 shown in FIG. 11 includes a region (thickness change region 57) where the ratio of the thicknesses of the high refractive index layer 52 and the low refractive index layer 53 constituting the diffractive lens 51 is varied.

In FIG. 11, the thickness of the periphery of the high refractive index layer 52 embedded in the low refractive index layer 53 varies. In this case, the periphery of the high refractive index layer 52 corresponds to the thickness change region 57. For example, in the high refractive index layer 52 forming the center (central region 55) of the pattern, the thickness of the high refractive index layer 52 increases stepwise from the periphery to the center, and the thickness of the low refractive index layer 53 decreases stepwise. In such a manner, the diffractive lens 51 includes the thickness change region 57 in which the ratio of the thicknesses of the high refractive index layer 52 and the thicknesses of the low refractive index layer 53 varies stepwise along the plane direction parallel to the incident surface 35.

The staircase shape provided in the thickness change region 57 is referred to as a blazed grating. For example, a plurality of phase differences is generated by the difference in refractive index between the layers constituting the staircase shape, which makes it possible to efficiently diffract the light in a specific angular direction. Thus, it is possible to bend the light in a desired direction, and to improve the condensing efficiency or the like.

The example shown in FIG. 11 is a four-level staircase shape in which the thickness of the high refractive index layer 52 has 0 to 3 steps. As the number of steps in this staircase becomes greater, the efficiency of bending in a specific angular direction becomes higher. The number of steps or the like of the staircase is not limited. For example, the diffractive lens 51 can be configured by stacking two or more high refractive index layers and low refractive index layers having different thicknesses.

Note that the staircase shape can be provided by using, for example, a photolithography technique. For example, after the high refractive index layer 52 of the first step is stacked, lithography and film formation for the high refractive index layer 52 of the second step are performed using a mask having a larger opening than the first step. It is possible to easily form a staircase shape by repeating such processes.

Figure 12:
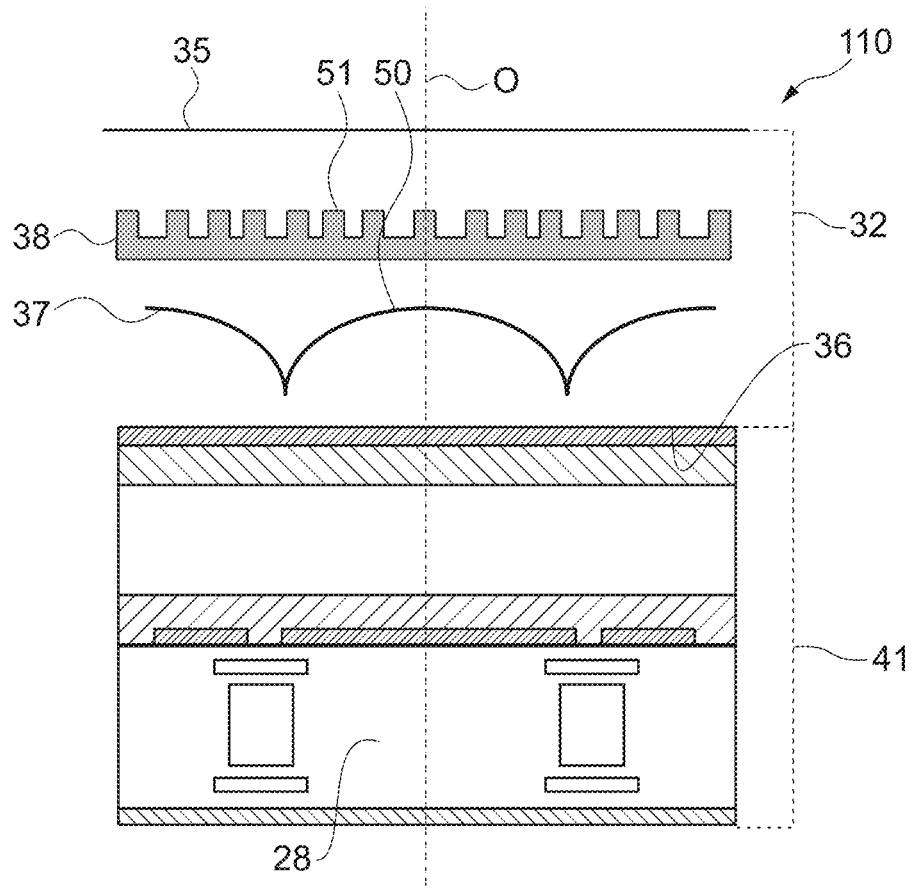
FIG. 12 is a cross-sectional view schematically showing another configuration example of a liquid crystal light valve.

FIG. 12 is a cross-sectional view schematically showing another configuration example of a liquid crystal light valve. In a liquid crystal light valve 110 shown in FIG. 12, as compared with the liquid crystal light valve 100 described with reference to FIG. 3 and the like, the arrangement of the refractive lens array 37 and the diffractive lens array 38 is reversed. Specifically, the refractive lens array 37 is disposed on the emission surface 36 side of the lens layer 32, and the diffractive lens array 38 is disposed on the incident surface 35 side of the lens layer 32.

Even when the lens layer 32 is configured in such a manner, it is possible to condense the light incident on the incident surface 35 and pass the light through the opening 28 by appropriately configuring the diffractive lens 51 and the refractive lens 50. Further, the refractive lens 50 is configured to correct the chromatic aberration due to the diffractive lens 51. Thus, it is possible to sufficiently suppress the chromatic aberration of light emitted from the refractive lens 50 and to sufficiently improve the condensing efficiency or the like to the opening 28.

As described above, in the liquid crystal light valve 100 according to this embodiment, the light incident on the optical control layer 41 is modulated for each pixel 16. The light incident on the incident surface 35 of the lens layer 32 and passing through the refractive lens 50 and the diffractive lens 51 disposed for each pixel 16 is emitted to the optical control layer 41. In such a manner, the refraction and diffraction of light are combined, and thus aberration or the like depending on the wavelength of the light is suppressed.

As a result, it is possible to control the optical path of the light incident on the optical control layer 41 regardless of the wavelength, and to achieve bright and high-quality image display.

Examples of the method of enhancing the light utilization efficiency in the liquid crystal display element or the like include a method of providing a single microlens utilizing refraction. In this method, light is condensed on the pixel aperture using a microlens. On the other hand, since the microlens utilizes refraction, a difference in aberration due to the wavelength occurs. Therefore, the optical path or the like emitted from the microlens differs depending on the wavelength, and there is a possibility that the light enters the light shielding layer, the TFT, or the like.

Figure 13A:
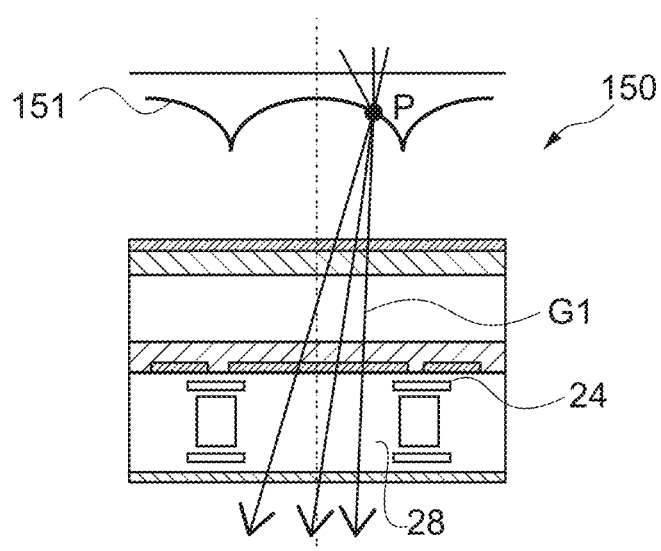
FIGS. 13A, 13B, and 13C are schematic diagrams showing an example of an optical path of light incident on a liquid crystal light valve as a comparative example.
Figure 13B:
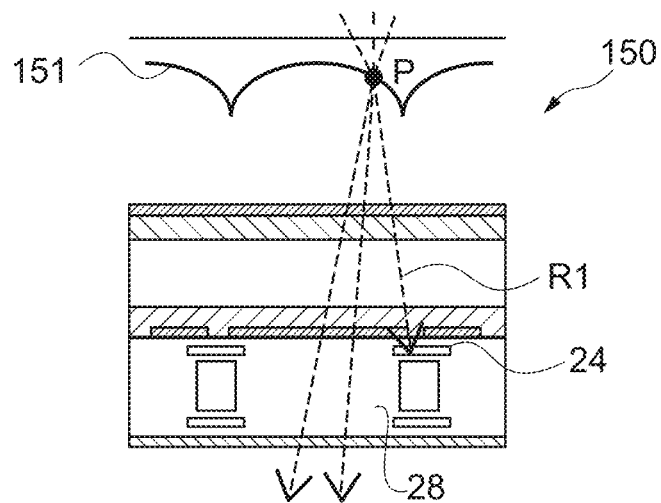
Figure 13C:
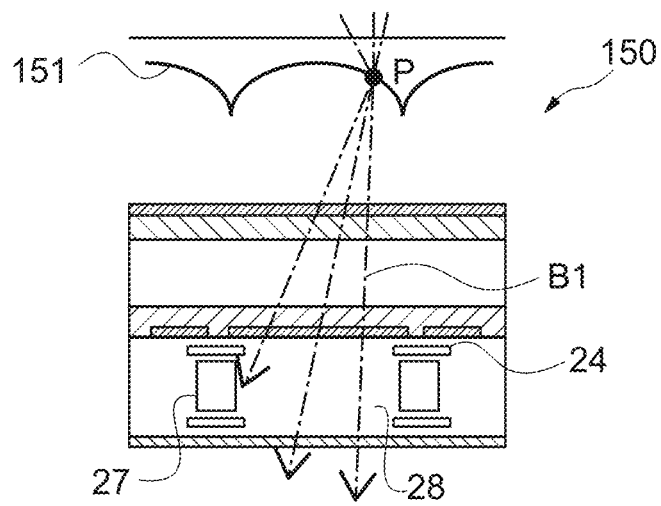

FIGS. 13A, 13B, and 13C are schematic diagrams showing an example of an optical path of light incident on a liquid crystal light valve 150 to be described as a comparative example. The liquid crystal light valve 150 includes a lens array in which a plurality of microlenses 151 that refracts light is disposed. Note that the liquid crystal light valve 150 is not provided with diffraction means such as a diffractive lens.

FIGS. 13A, 13B, and 13C schematically show an example of the optical path of each type light beam of green light G1, red light R1, and blue light B1 incident on the liquid crystal light valve 150. Further, in A to C of FIG. 13, light is incident on an incident position P of the microlens 151 along three types of optical paths. These optical paths are, for example, optical paths similar to the three optical paths described with reference to FIGS. 5A, 5B, and 5C.

Like the liquid crystal light valve 150, in a configuration in which a single microlens 151 (lens array) is used, for example, the lens shape or the like is optimized such that the efficiency is maximized at a specific wavelength. For example, the microlens 151 is optimized such that the optical path of the green light G1 passes through the opening 28. This is because the green light G1 appears brightest. For example, as shown in FIG. 13A, the green light G1 incident along the three types of optical paths is refracted by the microlens 151 and passes through the opening 28.

In FIG. 13B, the red light R1 is incident on the incident position P of the microlens 151 along the optical paths similar to the three types of optical paths in FIG. 13A. At this time, the refraction angle of each beam of the red light R1 is smaller than that of the green light G1. For this reason, for example, part of the red light R1 enters the light shielding portion 24 and is blocked. As a result, the amount of light passing through the opening 28 is reduced, and the light utilization efficiency is reduced.

Further, in FIG. 13C, the blue light B1 is incident on the incident position P of the microlens 151 along the optical paths similar to the three types of optical paths in FIG. 13A. At this time, the refraction angle of each bema of the blue light B1 is larger than that of the green light G1. For this reason, for example, part of the blue light B1 enters the light shielding portion 24 or the TFT 27. Consequently, there is a possibility that degradation of the image quality or the like occurs due to lowering of the light utilization efficiency or malfunction of the TFT 27.

Further, a method of controlling the optical path of the incident light by providing two-step microlenses 151 utilizing refraction is conceivable. In this case, both the microlenses 151 condense the light by utilizing refraction, and are thus affected by aberration due to the wavelength. This hinders a sufficient efficiency improvement depending on the wavelength. That is, the wavelength dependence occurs in the light utilization efficiency.

In this embodiment, the refractive lens 50 and the diffractive lens 51 are provided in the lens layer 32. The light passing through the refractive lens 50 and the diffractive lens 51 is emitted to the optical control layer 41 including the opening 28.

In such a manner, one of the lenses utilizes refraction, and the other one utilizes diffraction to control the light angle, and thus it is possible to sufficiently suppress the influence of chromatic aberration or the like of the light emitted from the lens layer 32. Thus, it is possible to increase the amount of light passing through the opening 28, and to achieve an improvement in light utilization efficiency independent of the wavelength of light.

Further, since the influence of chromatic aberration or the like is suppressed, it is possible to increase the amount of light regardless of the wavelength. Therefore, it is possible to increase the color of each wavelength of R, G, and B in a balanced manner as compared with a configuration optimized for a specific wavelength, for example. This makes it possible to display a high-quality color image.

With an increase in the amount of light passing through the opening 28, the amount of light incident on the light shielding portion 24 is reduced. Thus, it is possible to suppress the influence of heat received by the light shielding portion 24. As a result, the temperature of the entire element can be lowered. In addition, it is possible to sufficiently avoid the risk such as a failure of each element due to an increase in temperature.

Further, the light leakage or the like incident on the TFT 27 or the like disposed around the opening 28 can be sufficiently suppressed. Thus, it is possible to avoid malfunction of the TFT 27 or the like, and to suppress a decrease in image quality due to light leakage.

In such a manner, when the diffraction and refraction of light are combined to control the optical path of the light incident on the optical control layer 41, it is possible to improve the image quality together with the light utilization efficiency. This makes it possible to achieve bright and high-quality image display.

Further, as described with reference to FIGS. 8A, 8B, 8C, 8D, 9A, 9B, 9C, and 9D and the like, the diffractive lens 51 can be constituted by a thin film-like diffraction pattern 54, and is thus excellent in thinning. For example, the combination of the refractive lens 50 and the diffractive lens 51 allows the substrate itself to be thinned, as compared with the combination of the refractive lenses. The thinning of the lens in such a manner makes it possible to suppress a state where the substrate is warped. As a result, it is possible to improve the uniformity in the panel plane, and to increase the reliability and the like of the image quality and the apparatus.

Second Embodiment

A liquid crystal light valve of a second embodiment according to the present technology will be described. In the following description, description of the configurations and effects similar to those in the liquid crystal light valve 100 described in the above embodiment will be omitted or simplified.

Figure 14A:
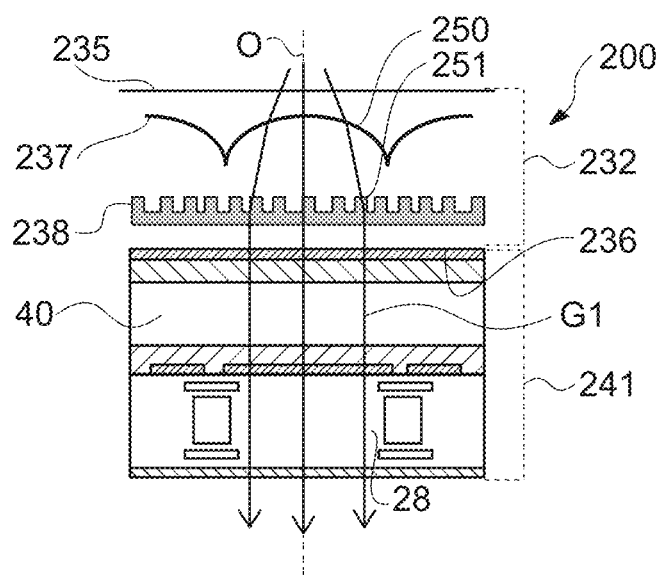
FIGS. 14A, 14B, and 14C are schematic diagrams showing an example of an optical path of light incident on a liquid crystal light valve according to a second embodiment.
Figure 14B:
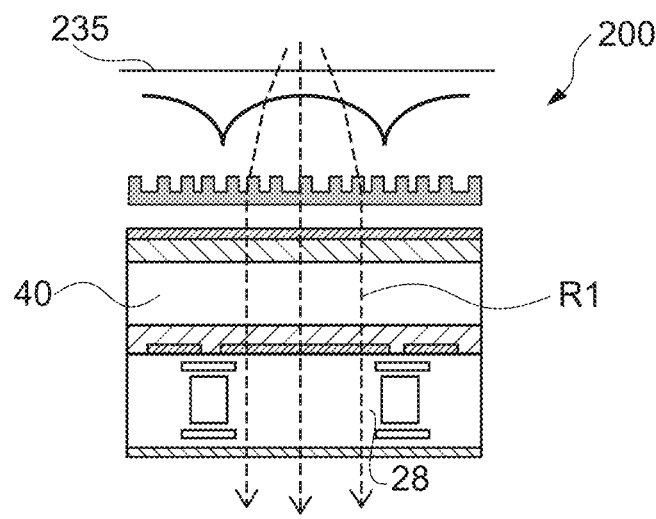
Figure 14C:
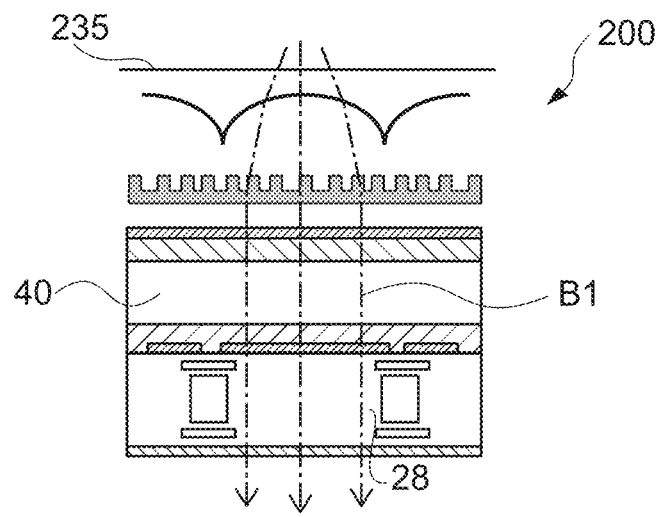

FIGS. 14A, 14B, and 14C are schematic diagrams showing an example of an optical path of light incident on a liquid crystal light valve 200 according to the second embodiment. In this embodiment, a refractive lens 250 and a diffractive lens 251 provided in a lens layer 232 are configured to collimate and emit incident light. Note that an optical control layer 241 of the liquid crystal light valve 200 is configured similarly to the optical control layer 41 of the liquid crystal light valve 100 described with reference to FIG. 3, for example.

In the lens layer 232, a refractive lens array 237 in which the plurality of refractive lenses 250 is disposed is disposed on an incident surface 235 side, and a diffractive lens array 238 in which the plurality of diffractive lenses 251 is disposed is disposed on an emission surface 236 side. Note that even when the diffractive lens array 238 is disposed on the incident surface side 235, and the refractive lens array 237 is disposed on the emission surface 236 side, the following description is applicable.

In this embodiment, the refractive lens 250 and the diffractive lens 251 collimate the optical path of the light incident on the incident surface 235 and emit the light to the opening 28. The refractive lens 250 and the diffractive lens 251 are typically configured to be capable of emitting parallel light parallel to the optical axis O.

For example, one of the refractive lens 250 and the diffractive lens 251 is configured as a condenser lens having a positive refractive power, and the other one is configured as a diverging lens having a negative refractive power. The combination of these condenser lens and diverging lens constitutes a lens pair that collimates the light incident. The present technology is not limited thereto, and any configuration capable of collimating the light incident on the incident surface 235 may be used.

FIGS. 14A, 14B, and 14C schematically show an example of the optical path of each color light beam of the green light G1, the red light R1, and the blue light B1 incident on the liquid crystal light valve 200. In FIG. 14A, the green light G1 enters the refractive lens 250 along three types of optical paths, i.e., an optical path parallel to the optical axis O and two optical paths traveling away from the above optical path to both sides. The green light G1 refracted by the refractive lens 250 is diffracted by the diffractive lens 251 and then emitted from the emission surface 236 as parallel light. The green light G1 that has become parallel light enters the optical control layer 241 and passes through the opening 28.

In of FIGS. 14B, and 14C, the red light R1 and the blue light B1 enter the refractive lens 250 along the optical paths similar to that of the green light G1 shown in FIG. 14A. The red light R1 and the blue light B1 pass through the refractive lens 250 and the diffractive lens 251 and are emitted as parallel light, and then pass through the opening 28 as they are.

By using the refractive lens 250 and the diffractive lens 251 in such a manner, a deviation or the like of the refraction angle and the diffraction angle depending on the wavelength of the light is suppressed, and it is possible to correct chromatic aberration. As a result, the lens layer 232 is capable of collimating and emitting incident light regardless of the wavelength of light.

Figure 15A:
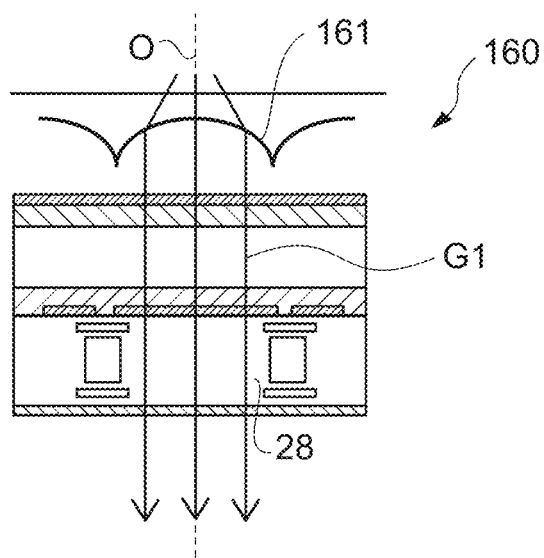
FIGS. 15A, 15B, and 15C are schematic diagrams showing an example of an optical path of light incident on a liquid crystal light valve as a comparative example.
Figure 15B:
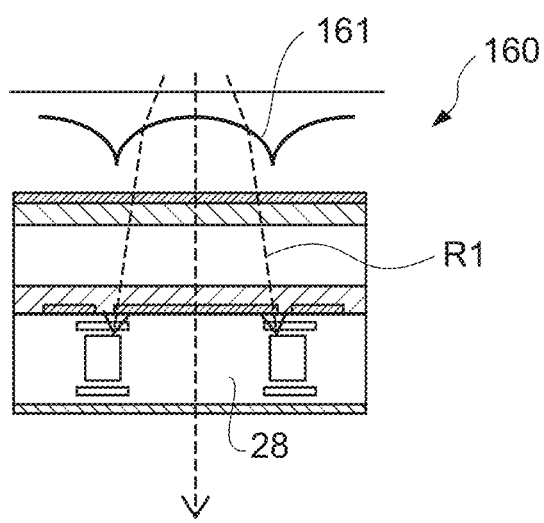
Figure 15C:
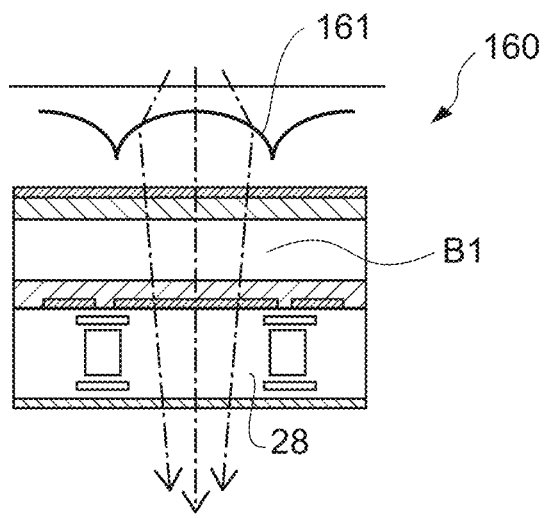

FIGS. 15A, 15B, and 15C are schematic diagrams showing an example of an optical path of light incident on a liquid crystal light valve 160 as a comparative example. In the liquid crystal light valve 160, the light incident by a microlens 161 utilizing refraction is collimated. Note that the liquid crystal light valve 160 is not provided with diffraction means such as a diffractive lens.

FIGS. 15A, 15B, and 15C schematically shows an example of the optical path of each type light beam of the green light G1, the red light R1, and the blue light B1 incident on the liquid crystal light valve 160. Each color light beam enters the microlens 161 along three types of optical paths. These optical paths are, for example, optical paths similar to the three optical paths described with reference to FIGS. 16A 16B, and 16C.

The microlens 161 is optimized to collimate the green light G1. As shown in FIG. 15A, the green light G1 incident on the microlens 161 is emitted toward the liquid crystal layer 40 along the optical paths parallel to the optical axis O.

Meanwhile, the red light R1 and the blue light B1 are affected by chromatic aberration of the microlens 161. For example, as shown in FIG. 15B, the red light beams R1 incident along the optical paths on both sides of the central optical path enter both sides of the opening 28 because the angle to be refracted is smaller than that of the green light G1. Further, as shown in FIG. 15C, the blue light beams B1 incident along the optical paths on both sides of the central optical path are emitted so as to be condensed toward the opening 28 because the angle to be refracted is smaller than that of the green light G1.

When the microlens 161 is used alone in such a manner, part of the light incident on the microlens 161 may be blocked due to the influence of chromatic aberration. Further, depending on the wavelength, the light may be converted into divergent light or condensed light.

For example, the light incident on the liquid crystal layer 40 parallel to the optical axis O, and the light incident on the liquid crystal layer 40 obliquely in an inclined state from the optical axis O have a difference in modulation accuracy of light by the liquid crystal. Specifically, a difference occurs in the angle of polarized light that is rotated by passing through the liquid crystal layer 40. As a result, for example, the light incident obliquely causes unnecessary leakage light or the like in each pixel 16, and there is a possibility that the contrast of the image display is lowered.

Figure 16A:
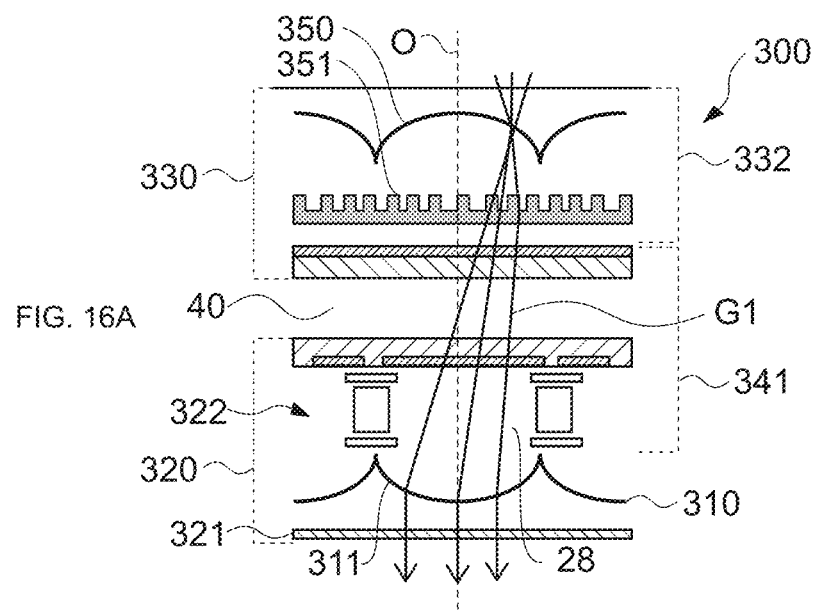
Figure 16B:
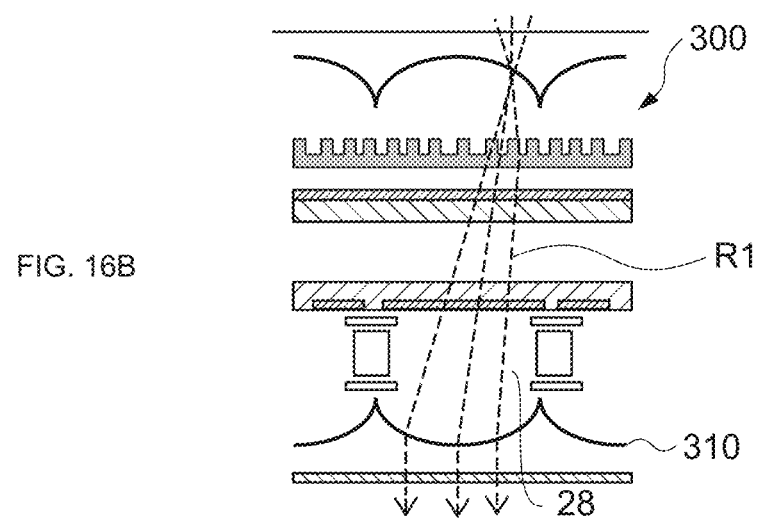
Figure 16C:
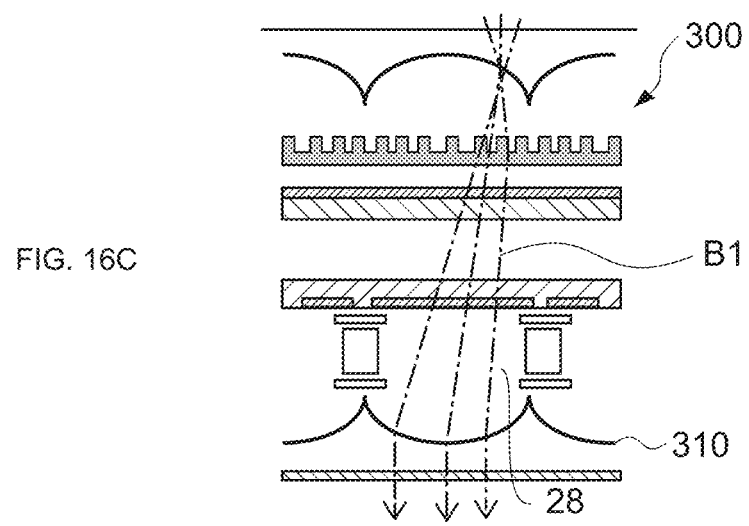

In this embodiment, as shown in FIGS. 16A, 16B, and 16C, the light incident from the incident surface 235 is collimated and emitted along the optical axis O regardless of the wavelength. Thus, it is possible to cause parallel light of various colors to enter the liquid crystal layer 40 along the optical axis, and to sufficiently suppress the light incident obliquely with respect to the liquid crystal layer 40. As a result, it is possible to sufficiently reduce unnecessary leakage light or the like in each pixel and to improve the contrast of the image display.

Third Embodiment

FIGS. 16A, 16B, and 16C are schematic diagrams showing an example of an optical path of light incident on a liquid crystal light valve 300 according to a third embodiment. In the above description, the lens layer is provided on the incident side of the optical control layer, and the optical path or the like of the light incident on the opening is controlled. In this embodiment, a microlens array 31s0 different from a lens layer 332 is formed on the emission side of an optical control layer 341.

FIGS. 16A, 16B, and 16C schematically shows an example of the optical path of each type light beam of green light G1, red light R1, and blue light B1 incident on the liquid crystal light valve 300. Each color light beam enters a corresponding microlens 311 of the microlens array 310 along three optical paths. These optical paths are, for example, optical paths similar to the three optical paths 5a to 5b described with reference to FIG. 7.

As shown in FIG. 16A, the liquid crystal light valve 300 includes the lens layer 332, the optical control layer 341, and the microlens array 310. The microlens array 310 is disposed on the opposite side of the lens layer 332 with the optical control layer 341 interposed therebetween, and controls the optical path of the light emitted from the optical control layer 341. Therefore, the light condensed, diverged, or collimated by the microlens array 310 is emitted from the liquid crystal light valve 300. Thus, it is possible to appropriately set the optical path of the light in accordance with the optical system of the subsequent stage.

The microlens array 310 is, for example, a lens array in which refractive lenses are arranged in a grid shape. Alternatively, a diffraction type microlens array 310 may be provided by a lens array in which diffractive lenses are arranged in a grid shape. Alternatively, for example, the microlens array 310 may be configured by a combination of a refractive lens and a diffractive lens.

In the example shown in FIG. 16A, the microlens array 310 is disposed between a circuit layer 322 and a transparent substrate 321 inside a control substrate 320. In addition, the microlens array 310 may be formed on the emission side (second surface) of the transparent substrate 321.

In this embodiment, the microlens array 310 collimates the optical path of the light emitted from the optical control layer 341. That is, the microlens array 310 emits parallel light from the liquid crystal light valve 300. When parallel light is emitted in such a manner, it is possible to increase the amount of light taken in by the optical system in the subsequent stage (dichroic mirror, projection system, etc.) of the liquid crystal light valve 300.

For example, if a lens (lens layer 332) is provided on the incident side, the emission angle (ray angle) of the light emitted from the optical control layer 341, or the like is increased, and there is a possibility that the amount of light taken in by a projection lens or the like of a projection system may be reduced. Therefore, when the microlens 311 is provided on the emission side, it is possible to collimate the light emitted in a spread manner and suppress the divergence of the light. Thus, it is possible to increase the amount of light taken in by the projection lens or the like.

For example, as shown in FIG. 16A, the green light beams G1 incident along the three optical paths are emitted by the refractive lens 350 and the diffractive lens 351 provided on the incident side so as to pass through the opening 28. The green light beams G1 passing through the opening 28 enter the microlens array 310 (microlens 311) provided on the emission side of the optical control layer 341 and are emitted as parallel light. Similarly, the red light R1 and the blue light B1 shown in FIGS. 16B and 16C also pass through the opening 28 and are emitted as parallel light.

In the light incident on the microlens 311, which has passed through the diffractive lens 351 and the refractive lens 350, the wavelength dependence of the focal length or the like is suppressed. Thus, it is possible for the microlens array 310 to efficiently extract light, for example, as compared with the configuration in which a pair of the diffractive lens 351 and the refractive lens 350 is not provided. This makes it possible to achieve sufficiently bright and high-quality image display.

Other Embodiments

The present technology is not limited to the embodiments described above and can achieve various other embodiments.

In the above description, the configuration in which the light incident from the lens layer passes through the liquid crystal layer and enters the control substrate has been described. The present technology is not limited thereto. For example, a configuration in which light incident from the lens layer passes through the control substrate and enters the liquid crystal layer may be employed. That is, the lens layer may be disposed facing the control substrate.

For example, the lens layer is bonded to one surface of the control substrate. Further, the transparent substrate is disposed at a predetermined interval on the other surface of the control substrate, and the liquid crystal layer is formed between the control substrate and the transparent substrate. In this case, light modulated for each pixel is emitted from the transparent substrate. Even in such a configuration, it is possible to improve the light utilization efficiency while correcting chromatic aberration by appropriately providing a pair of refractive lens and diffractive lens in the lens layer.

FIGS. 17A, 17B, 18A, 18B, 19, and 20 are schematic diagrams showing examples of a display apparatus according to other embodiments. In the above description, the liquid crystal light valve used in a projection type display apparatus (image display apparatus etc.) or the like has been mainly described. The present technology is applicable to various display apparatuses besides the projection type display apparatuses. Hereinafter, examples of other display apparatuses will be described with reference to FIGS. 17A, 17B, 18A, and 18B.

Figure 17A:
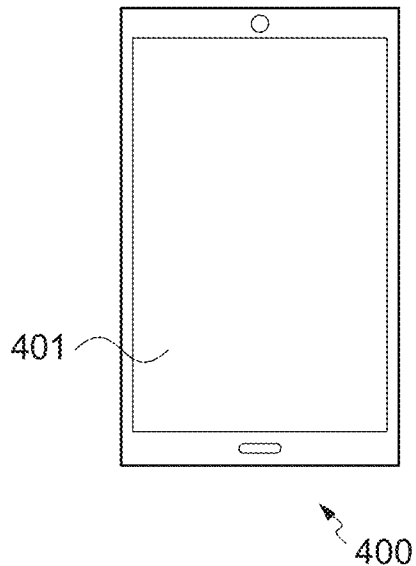
FIGS. 17A and 17B are schematic diagrams showing an example of a display apparatus according to another embodiment.
Figure 17B:
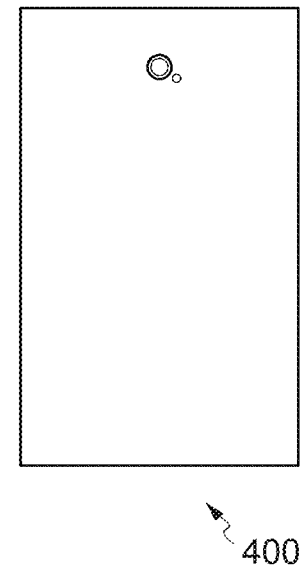

FIGS. 17A and 17B shows the appearance of a mobile terminal. FIG. 17A is a front view of a mobile terminal 400, and FIG. 17B is a rear view of the mobile terminal 400. A display 401 for display is disposed in front of the mobile terminal 400. A liquid crystal light valve or the like is applied to the display 401. In this case, for example, light from the backlight emitting white light enters the lens layer including a refractive lens and a diffractive lens. Even when white light is incident in such a manner, it is possible to properly correct the aberration of each color light.

Figure 18A:
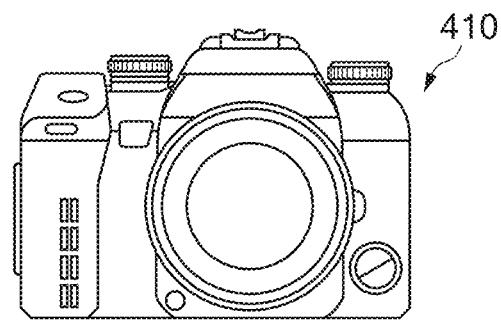
FIGS. 18A and 18B are schematic diagrams showing an example of a display apparatus according to another embodiment.
Figure 18B:
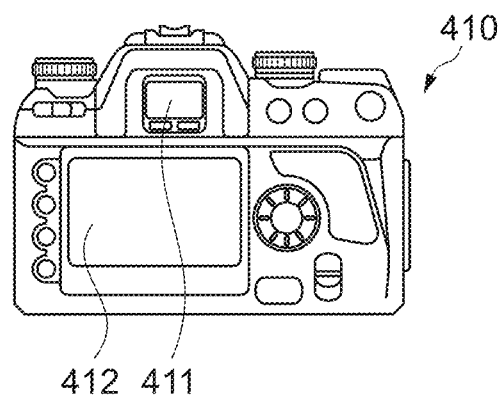
Figure 19:
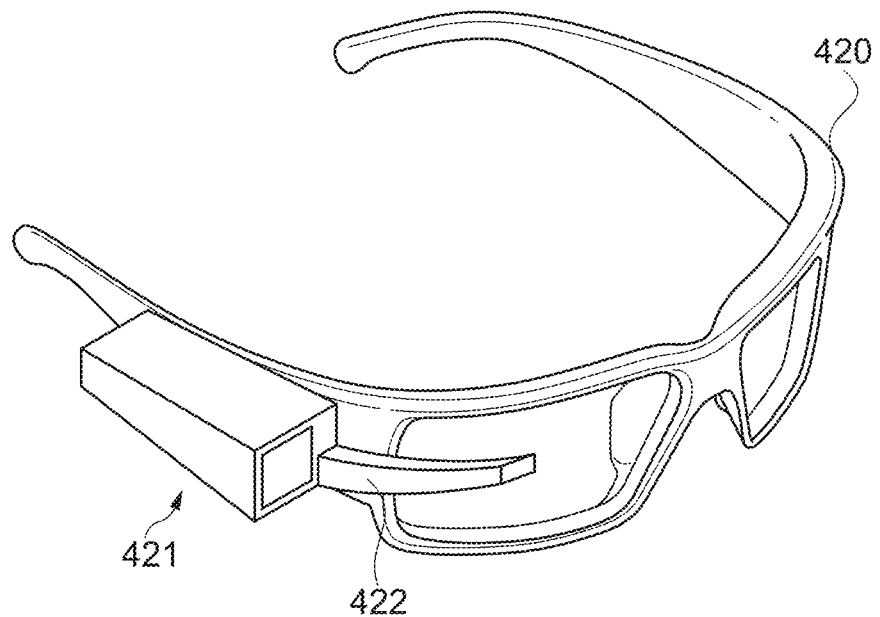
FIG. 19 is a schematic diagram showing an example of a display apparatus according to another embodiment.

FIGS. 18A and 18B shows the appearance of a digital camera. FIG. 18 is a front view of a digital camera 410, and FIG. 18B is a rear view of the digital camera 410. The digital camera 410 includes a viewfinder unit 411, and the liquid crystal light valve or the like described above is used for the viewfinder unit 411. The digital camera 410 also includes a sub-display 412. The liquid crystal light valve or the like may be used for the sub-display 412.s FIG. 19 shows the appearance of an eyewear 420 such as eyeglasses, goggles, and sunglasses in which an eyewear-mounted type one-eye display module 421 is mounted. The eyewear-mounted type one-eye display module 421 includes, for example, a light source and a liquid crystal display element 422. The liquid crystal light valve or the like described above is applied to the liquid crystal display element 422.

Figure 20:
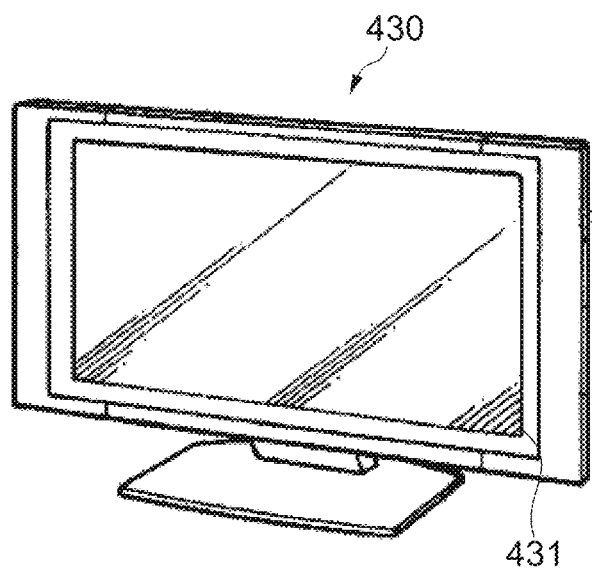
FIG. 20 is a schematic diagram showing an example of a display apparatus according to another embodiment.

FIG. 20 shows the appearance of a television apparatus 430 as an electronic apparatus. The television apparatus 430 includes a flat panel type liquid crystal display 431. The configuration of the lens layer or the like of the liquid crystal light valve described above is applied to a liquid crystal element (liquid crystal display element) that drives the liquid crystal display 431. In addition, the present technology can be applied to any display apparatus that displays an image using liquid crystal or the like.

Of the feature portions according to the present technology described above, at least two feature portions can be combined. That is, the various feature portions described in the embodiments may be arbitrarily combined without distinguishing between the embodiments. Further, the various effects described above are not limitative but are merely illustrative, and other effects may be provided.

In the present disclosure, "same", "equal", "orthogonal", and the like are concepts including "substantially the same", "substantially equal", "substantially orthogonal", and the like. For example, the states included in a predetermined range (e.g., ±10%) with reference to "completely the same", "completely equal", "completely orthogonal", and the like are also included.

Note that the present technology may also take the following configurations.

(1) A display element, including:
an optical control layer that modulates incident light for each pixel; and
a lens layer that includes an incident surface, a plurality of refractive lenses disposed for each pixel, and a plurality of diffractive lenses disposed for each pixel to face the plurality of refractive lenses, and emits light incident from the incident surface and passing through the plurality of refractive lenses and the plurality of diffractive lenses to the optical control layer.

(2) The display element according to (1), in which
the lens layer includes
a refractive lens array in which the plurality of refractive lenses is two-dimensionally arranged, and
a diffractive lens array in which the plurality of diffractive lenses is two-dimensionally arranged.

(3) The display element according to (2), in which
the lens layer includes an emission surface opposite to the incident surface, and
any one of the refractive lens array and the diffractive lens array is disposed on the incident surface side, and another one is disposed on the emission surface side.

(4) The display element according to any one of (1) to (3), in which
the optical control layer includes
a liquid crystal layer that modulates incident light, and
a control substrate that is bonded to the liquid crystal layer and controls the modulation of light by the liquid crystal layer for each pixel, and
the lens layer is disposed facing one of the liquid crystal layer and the control substrate.

(5) The display element according to (4), in which
the control substrate includes a light shielding portion including a plurality of openings each serving as the pixel, and
the refractive lens and the diffractive lens condense light incident on the incident surface and pass the light through the opening.

(6) The display element according to (5), in which
the refractive lens and the diffractive lens collimate an optical path of the light incident on the incident surface and emit the light to the opening.

(7) The display element according to (5) or (6), in which
the lens layer includes a first diffractive lens disposed to correspond to a first opening, and a second diffractive lens disposed to correspond to a second opening adjacent to the first opening, and emits light incident on a boundary portion between the first diffractive lens and the second diffractive lens toward at least one of the first opening or the second opening.

(8) The display element according to any one of (5) to (7), in which
the control substrate includes a control element that controls the liquid crystal layer for each pixel, and
the light shielding portion shields the control element from light.

(9) The display element according to any one of (1) to (8), in which
the diffractive lens includes
a high refractive index layer, and
a low refractive index layer having a lower refractive index than a refractive index of the high refractive index layer.

(10) The display element according to (9), in which
the diffractive lens has a diffraction pattern in which the high refractive index layer and the low refractive index layer are alternately disposed in a plane direction parallel to the incident surface.

(11) The display element according to (10), in which
the diffraction pattern includes
a central region as the center of the pattern, and
a plurality of strip-shaped regions concentrically disposed around the central region, when viewed from the incident surface.

(12) The display element according to (11), in which
the central region is eccentrically disposed with respect to the center of the opening when viewed from the incident surface.

(13) The display element according to (11) or (12), in which
the central region is any one of a circle, an ellipse, a polygon, and a rounded-corner polygon.

(14) The display element according to any one of (9) to (13), in which
the diffractive lens is formed by embedding the low refractive index layer in the high refractive index layer or formed by embedding the high refractive index layer in the low refractive index layer.

(15) The display element according to any one of (9) to (13), in which
the diffractive lens is formed at a junction of the high refractive index layer and the low refractive index layer.

(16) The display element according to any one of (9) to (15), in which
the diffractive lens includes a thickness change region in which a ratio of a thickness of the high refractive index layer and a thickness of the low refractive index layer varies stepwise along a plane direction parallel to the incident surface.

(17) The display element according to any one of (1) to (16), further including
a microlens array that is disposed on an opposite side of the lens layer with the optical control layer interposed between the microlens array and the lens layer, and controls an optical path of light emitted from the optical control layer.

(18) The display element according to (17), in which
the microlens array collimates the optical path of the light emitted from the optical control layer.

(19) A projection type display apparatus, including:
a light source;
a display element including
an optical control layer that modulates incident light for each pixel, and
a lens layer that includes an incident surface on which light emitted from the light source is incident, a plurality of refractive lenses disposed for each pixel, and a plurality of diffractive lenses disposed for each pixel to face the plurality of refractive lenses, and emits light incident from the incident surface and passing through the plurality of refractive lenses and the plurality of diffractive lenses to the optical control layer; and
a projection optical system that projects an image on the basis of the light modulated for each pixel.

REFERENCE SIGNS LIST 11 display region
16 pixel 20, 320 control substrate
23 control element
24 light shielding portion
28, 28a, 28b opening
32, 232, 332 lens layer
35, 235 incident surface
36, 236 emission surface
37, 237 refractive lens array
38, 238 diffractive lens array
40 liquid crystal layer
41, 241, 341 optical control layer
50, 250, 350 refractive lens
51, 251, 351 diffractive lens
52 high refractive index layer
53 low refractive index layer
54, 54a to 54f diffraction pattern
55 central region
56 strip-shaped region
57 change region
100, 100R, 100G, 100B, 110, 200, 300 liquid crystal light valve
500 image display apparatus

The invention claimed is:

1. A display element, comprising:
an optical control layer configured to modulate incident light for each pixel; and
a lens layer that includes an incident surface, a plurality of refractive lenses disposed for each pixel, and a plurality of diffractive lenses disposed for each pixel, wherein
the plurality of diffractive lenses faces the plurality of refractive lenses,
the lens layer is configured to emit light incident from the incident surface and passing through the plurality of refractive lenses and the plurality of diffractive lenses to the optical control layer,
each of the plurality of diffractive lenses includes a high refractive index layer and a low refractive index layer having a lower refractive index than a refractive index of the high refractive index layer, and
a thickness change region of each of the plurality of diffractive lenses has a ratio of a thickness of the high refractive index layer and a thickness of the low refractive index layer that varies stepwise along a plane direction parallel to the incident surface.

2. The display element according to claim 1, wherein the lens layer includes
a refractive lens array in which the plurality of refractive lenses is two-dimensionally arranged, and
a diffractive lens array in which the plurality of diffractive lenses is two-dimensionally arranged.

3. The display element according to claim 2, wherein
the lens layer includes an emission surface opposite to the incident surface, and
one of the refractive lens array or the diffractive lens array is on an incident surface side, and the other of the refractive lens array or the diffractive lens array is on an emission surface side.

4. The display element according to claim 2, wherein the optical control layer includes
a liquid crystal layer configured to modulate the incident light, and
a control substrate bonded to the liquid crystal layer, the control substrate is configured to control the modulation of the incident light by the liquid crystal layer for each pixel, and
the lens layer faces one of the liquid crystal layer or the control substrate.

5. The display element according to claim 4, wherein
the control substrate includes a light shielding portion that includes a plurality of openings,
each of the plurality of openings serves as the pixel, and
the refractive lens array and the diffractive lens array condense light incident on the incident surface and pass the light through the plurality of openings.

6. The display element according to claim 5, wherein the plurality of refractive lenses and the plurality of diffractive lenses collimate an optical path of the light incident on the incident surface and emit the light to the plurality of openings.

7. The display element according to claim 5, wherein
the lens layer includes a first diffractive lens of the plurality of diffractive lenses, and a second diffractive lens of the plurality of diffractive lenses,
the first diffractive lens corresponds to a first opening of the plurality of openings and the second diffractive lens corresponds to a second opening of the plurality of openings,
the second opening is adjacent to the first opening, and
the lens layer is configured to emit light incident on a boundary portion between the first diffractive lens and the second diffractive lens toward at least one of the first opening or the second opening.

8. The display element according to claim 5, wherein
the control substrate includes a control element configured to control the liquid crystal layer for each pixel, and
the light shielding portion is configured to shield the control element from the light.

9. The display element according to claim 1, wherein
each of the plurality of diffractive lenses has a diffraction pattern in which the high refractive index layer and the low refractive index layer are alternately disposed in a plane direction parallel to the incident surface.

10. The display element according to claim 9, wherein the diffraction pattern includes a central region as a center of the diffraction pattern, and a plurality of strip-shaped regions concentrically disposed around the central region, when viewed from the incident surface.

11. The display element according to claim 10, wherein the central region is eccentrically disposed with respect to a center of an opening when viewed from the incident surface.

12. The display element according to claim 10, wherein the central region is one of a circle, an ellipse, a polygon, or a rounded-corner polygon.

13. The display element according to claim 1, wherein
each of plurality of the diffractive lenses includes one of the low refractive index layer embedded in the high refractive index layer or the high refractive index layer embedded in the low refractive index layer.

14. The display element according to claim 1, wherein each of the plurality of the diffractive lenses is at a respective junction of the high refractive index layer and the low refractive index layer.

15. The display element according to claim 1, further comprising a microlens array on an opposite side of the lens layer with the optical control layer interposed between the microlens array and the lens layer, wherein the microlens array is configured to control an optical path of light emitted from the optical control layer.

16. The display element according to claim 15, wherein the microlens array is further configured to collimate the optical path of the light emitted from the optical control layer.

17. A projection type display apparatus, comprising:
a light source;
a display element including
an optical control layer configured to modulate incident light for each pixel, and
a lens layer that includes an incident surface on which light emitted from the light source is incident, a plurality of refractive lenses disposed for each pixel, and a plurality of diffractive lenses disposed for each pixel, wherein
the plurality of diffractive lenses faces the plurality of refractive lenses,
the lens layer is configured to emit light incident from the incident surface and passing through the plurality of refractive lenses and the plurality of diffractive lenses to the optical control layer,
each of the plurality of diffractive lenses includes a high refractive index layer and a low refractive index layer having a lower refractive index than a refractive index of the high refractive index layer, and
a thickness change region of each of the plurality of diffractive lenses has a ratio of a thickness of the high refractive index layer and a thickness of the low refractive index layer that varies stepwise along a plane direction parallel to the incident surface; and
a projection optical system configured to project an image based on the light modulated for each pixel.

* * * * *